(12) United States Patent
McDavitt-Van Fleet

(10) Patent No.: US 9,965,960 B1
(45) Date of Patent: May 8, 2018

(54) FACILITATING TRANSPORTATION SERVICES BY GENERATING A DIRECTIONAL INDICATOR BETWEEN A REQUESTER AND A TRANSPORTATION VEHICLE

(71) Applicant: Lyft, Inc., San Francisco, CA (US)

(72) Inventor: Nathan McDavitt-Van Fleet, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 0 days. days.

(21) Appl. No.: 15/670,527

(22) Filed: Aug. 7, 2017

(51) Int. Cl.
| | |
|---|---|
| G08G 1/123 | (2006.01) |
| H04W 4/12 | (2009.01) |
| G08G 1/00 | (2006.01) |
| G01C 21/36 | (2006.01) |
| H04W 4/02 | (2018.01) |
| G06Q 50/30 | (2012.01) |

(52) U.S. Cl.
CPC ......... *G08G 1/205* (2013.01); *G01C 21/3667* (2013.01); *G06Q 50/30* (2013.01); *G08G 1/202* (2013.01); *H04W 4/023* (2013.01)

(58) Field of Classification Search
CPC ........ G08G 1/205; G08G 1/144; G08G 1/123; H04W 4/12; G06Q 10/06315; G06Q 10/00; G07C 9/00563; G07C 5/008; G05D 1/0016; G09B 29/106; G01C 25/00; G01C 21/367; G01C 21/3647; G01C 21/28; G01C 21/34; G01S 19/49; G06K 9/3216
See application file for complete search history.

(56) References Cited

U.S. PATENT DOCUMENTS

| | | | |
|---|---|---|---|
| 2012/0176255 A1* | 7/2012 | Choi ..................... | G06Q 10/00 340/989 |
| 2012/0191339 A1* | 7/2012 | Lee ..................... | G01C 21/3647 701/410 |
| 2012/0219188 A1* | 8/2012 | Kurz .................... | G06K 9/3216 382/103 |
| 2013/0338958 A1* | 12/2013 | Shanishchara ......... | G01C 25/00 702/116 |
| 2014/0005928 A1* | 1/2014 | Giannetta ............... | G01S 19/49 701/431 |
| 2015/0046022 A1* | 2/2015 | Bai ....................... | G07C 5/008 701/31.5 |

(Continued)

*Primary Examiner* — Yuri Kan
(74) *Attorney, Agent, or Firm* — Keller Jolley Preece

(57) ABSTRACT

The present disclosure is directed toward systems and methods for providing an indicator of a direction between a requester and a transportation vehicle. For example, the systems and methods described herein can provide a dynamic digital compass from the current orientation of a requester client device to the location of a transportation vehicle. For example, the systems and methods described herein can determine a location of a requester client device, a location of a transportation vehicle, and an orientation of the requester client device. The systems and methods can also utilize the location of the requester client device, the location of the transportation vehicle, and the orientation of the requester client device to identify a direction from the requester client device to the transportation vehicle relative to the current orientation of the requester client device and provide a digital compass to indicate the direction to the transportation vehicle.

20 Claims, 13 Drawing Sheets

(56) References Cited

U.S. PATENT DOCUMENTS

2015/0211880 A1\* 7/2015 Arita .................... G09B 29/106
                                                        701/409
2015/0332532 A1\* 11/2015 Lee .................... G07C 9/00563
                                                        340/5.72
2015/0382160 A1\* 12/2015 Slay, Jr. ................. H04W 4/12
                                                        455/466
2016/0306350 A1\* 10/2016 Shim .................... G05D 1/0016
2017/0160095 A1\*  6/2017 Sheha .................. G01C 21/367
2017/0229017 A1\*  8/2017 Bartsch ................. G08G 1/144
2017/0286884 A1\* 10/2017 Shoval ............ G06Q 10/06315

\* cited by examiner

FACILITATING TRANSPORTATION SERVICES BY GENERATING A DIRECTIONAL INDICATOR BETWEEN A REQUESTER AND A TRANSPORTATION VEHICLE

BACKGROUND

Transportation services (e.g., ride share services, taxi services, etc.) provide a way for requesters to travel from one place to another with relative ease. For example, ride share transportation services enable requesters to request transportation from nearly any location and at almost any time. By assigning a nearby provider to pick up a requesting passenger (i.e., requester), transportation services generally provide an added level of convenience to the requester, without the requester relying on a bus schedule, navigating to a subway station, or even owning a vehicle. To illustrate, a ride share transportation service may enable a requester to request a provider for roadside pickup and to deliver the requester to a desired destination (e.g., as the requester designates by way of a mobile device). The ride share system then matches and assigns a provider for the requester based on location and other factors to quickly and efficiently transport the requester. With the advancement of smartphones, requesting a provider is even simpler than before. For instance, a requester can utilize a mobile application to request a provider, and, via the location information associated with the smartphone, the ride share system can match a nearby provider to the request to pick up the requester and deliver the requester to a desired destination, all more efficiently than in times past. However, while conventional transportation systems do provide some benefits, conventional transportation systems nonetheless have several disadvantages.

For example, conventional transportation systems provide information at a level of detail that inhibits requesters and/or providers from effectively locating one another for pickup. To illustrate, in cases where a requester is searching for a transportation vehicle that has arrived for pickup in a crowded, unfamiliar, and/or complicated area, conventional systems may provide a map and/or identification information associated with the transportation vehicle (such as make, model, license plate number, etc.); however, given the lack of familiarity or the complicated nature of the area, requesters often have difficulty locating the transportation vehicle. Similarly, as requesters wander through crowded, unfamiliar, and/or complex locations, providers often have difficulty locating a particular requester to initiate a ride. As a result, requesters often experience frustration and confusion in locating transportation vehicles arriving for pickup when utilizing conventional transportation systems. Similarly, providers often express frustration and confusion in locating requesters waiting for pickup when utilizing conventional transportation systems.

In addition to causing frustration and confusion, conventional transportation systems also lead to inefficiencies and missed ride opportunities. For example, when a provider of a transportation vehicle that is assigned to pick up a requester waits too long (or cannot locate the requester) or when a requester cannot locate the transportation vehicle, the requester and/or provider may cancel the pickup request. Accordingly, requesters often initiate duplicate pickup requests from the same location. Conversely, utilizing conventional transportation systems, providers often waste valuable time searching for requesters in which they could have earned a fare from another requester.

Because conventional transportation systems result in missed pickups and duplicative pickup requests, these systems also suffer from heavier digital communications traffic. As a result, these conventional transportation systems also require more processing time and processing power in assigning multiple transportation vehicles to pick up a single requester. Thus, conventional systems sometimes require more computing resources than necessary for matching a requester to a transportation vehicle for pickup.

Thus, there are several disadvantages with regard to conventional transportation systems.

SUMMARY

One or more embodiments described herein provide benefits and solve one or more of the foregoing or other problems in the art with systems and methods that facilitate transportation services by generating and providing a directional indicator between a requester and a transportation vehicle. To illustrate, in some embodiments, the systems and methods described herein generate and provide a digital compass to a requester client device (and/or a provider client device) that dynamically points between a requester and a transportation vehicle. For example, to provide the digital compass or other indicator(s), the systems and methods can determine a location of the requester (e.g., by way of a requester client device) and a location of the transportation vehicle. The systems and methods can additionally determine an orientation of the requester client device—i.e., a direction in which the requester client device is pointing. Based on the location of the requester, the location of the transportation vehicle, and the orientation of the requester, the systems and methods can identify a direction from the requester client device to the transportation vehicle, and further provide a digital compass or other indicator(s) via the requester client device to indicate the identified direction.

By providing a directional indicator between the requester client device and the transportation vehicle, the systems and methods described herein can assist requesters (and/or providers) in initiating transportation services, even in complicated or confusing areas. For example, in cases where a requester is looking for a transportation vehicle in a crowded, complex intersection, the systems and methods can provide a definite direction from the requester's current location and orientation directly to the transportation vehicle assigned to pick up the requester. Therefore, the requester may look for the transportation vehicle in a greatly reduced field of view, making it much easier to locate the transportation vehicle. Similarly, the disclosed systems and methods can provide a direction from the provider client device directly to the requester client device relative to the orientation of the provider client device, making it easier for the provider to identify and pick up the requester.

As a result of providing information to make it easier for the requester to locate the transportation vehicle (and/or the provider to locate the requester), the systems and methods described herein result in a relatively small number of pickup request cancelations. For example, because a requester can effectively find a transportation vehicle assigned for a given pickup request, the requester need not cancel the pickup request and request a new pickup from the same location. In short, the systems and methods process fewer ride requests and require less processing time and processing power as a result.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
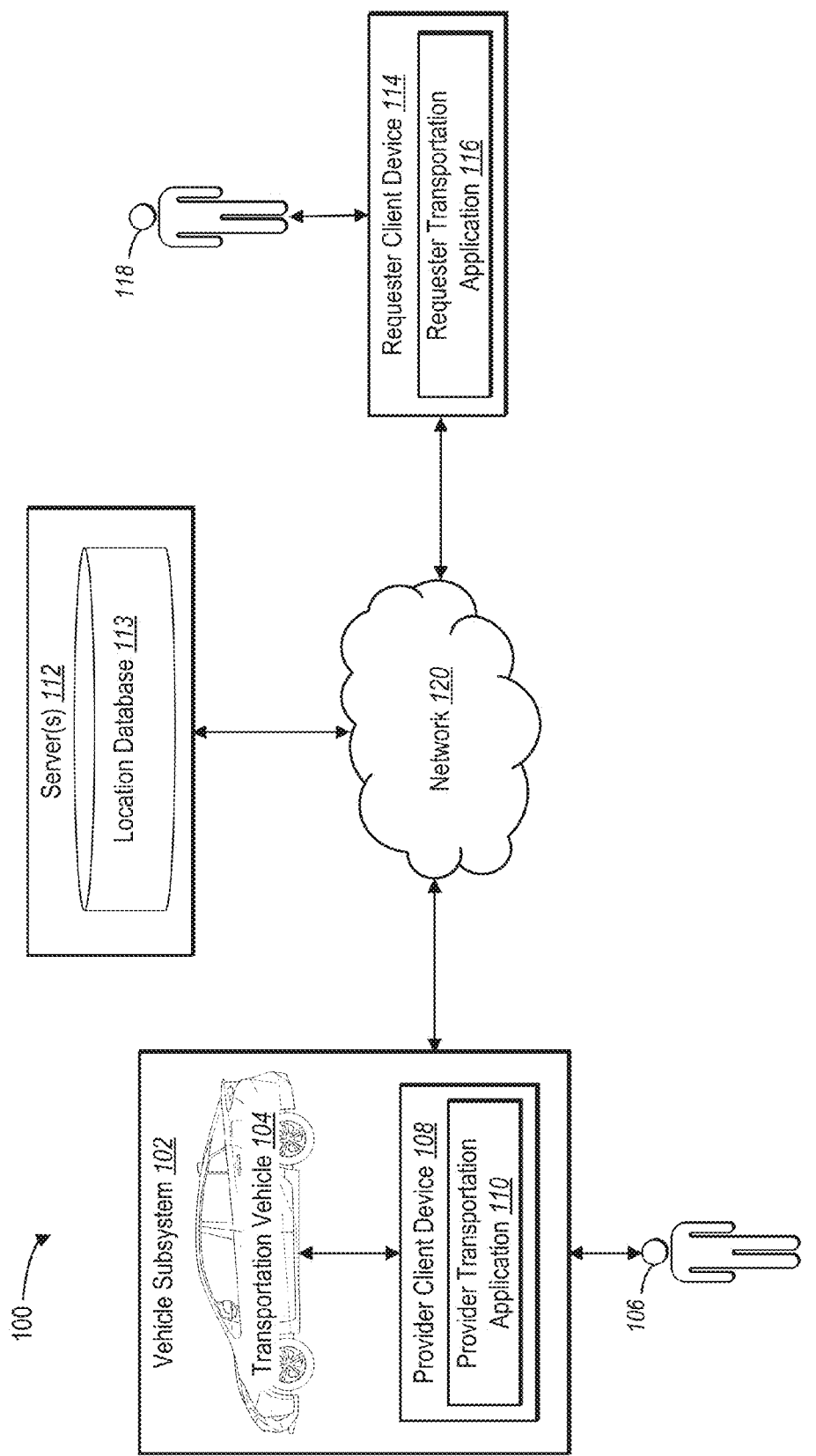
FIG. 1 illustrates a schematic diagram of an example environment of a transportation orientation system in accordance with one or more embodiments.

One or more embodiments described herein provide benefits and solve one or more of the foregoing or other problems in the art with a transportation orientation system that generates and provides an indicator of a direction between a requester and a transportation vehicle assigned to pick up the requester. For instance, in some embodiments, the transportation orientation system provides a digital compass via a requester client device, where the digital compass points in the direction of the transportation vehicle relative to the orientation of the requester client device. Indeed, upon receiving a pickup request from the requester, the transportation orientation system can match a transportation vehicle to pick up the requester and provide a dynamic digital compass and/or other indicator(s) to help the requester locate the transportation vehicle.

To illustrate, in one or more embodiments, the transportation orientation system determines a location of a requester client device, a location of a transportation vehicle, and an orientation of the requester client device. Further, the transportation orientation system identifies a direction from the requester client device to the transportation vehicle based on the determined location of the requester client device, the determined location of the transportation vehicle, and the determined orientation of the requester client device. Then, the transportation orientation system provides, via the requester client device, an indicator corresponding to the identified direction from the requester client device to the transportation vehicle. Moreover, upon detecting a change in at least one of the location of the requester client device, the location of the transportation vehicle, or the orientation of the requester client device, the transportation orientation system determines a modified direction from the requester client device to the transportation vehicle and provides (e.g., via the requester client device) an updated indicator associated with the modified direction from the requester client device to the transportation vehicle.

As just mentioned, to provide the digital compass and/or other indicator(s), the transportation orientation system can determine various parameters associated with the requester and the assigned transportation vehicle. For instance, in one or more embodiments, the transportation orientation system determines a location of the requester by way of a requester client device (e.g., a smartphone) associated with the requester and a location of a transportation vehicle by way of a client device associated with the transportation vehicle (e.g., utilizing GPS technology in the requester client device and provider client device). Similarly, the transportation orientation system can determine an orientation of the requester client device (e.g., utilizing a magnetometer of the requester client device).

Using the location of the requester client device and the location of the transportation vehicle, the transportation orientation system can determine a vector from the requester client device to the transportation vehicle. For instance, the transportation orientation system can generate a vector that originates at the requester client device and points in the direction of the transportation vehicle.

To determine the direction in which to orientate the digital compass, the transportation orientation system can determine an offset angle between the orientation of the requester client device (e.g., the direction in which the requester client device is pointing) and the vector originating at the location of the requester client device and pointing toward the location of the transportation vehicle. For instance, the transportation orientation system can determine an offset angle by calculating a difference between the orientation of the requester client device and the direction from the requester client device to the transportation vehicle. Utilizing the offset angle, the transportation orientation system can generate and provide an indicator (e.g., digital compass) to the client device that points in the direction of the transportation vehicle relative to the orientation of the requester client device.

Additionally, in one or more embodiments, the transportation orientation system also applies a threshold angle and generates one or more indicators when the threshold angle has been satisfied. For example, the transportation orientation system can apply a threshold angle to detect whether the requester client device is oriented in a direction that points close to (e.g., within the threshold angle of) the transportation vehicle. To illustrate, in response to detecting that the requester client device is oriented within the threshold angle of the direction of the transportation vehicle, the transportation orientation system may provide an indicator. For instance, the transportation orientation system may provide an auditory alert, a haptic alert, or a visual alert by way of the client requester client device in response to detecting that the orientation of the requester client device is within the threshold angle of the transportation vehicle.

Moreover, the transportation orientation system can also provide an indicator to the requester by way of the transportation vehicle. To illustrate, in response to determining that the requester client device is oriented within the threshold angle, the transportation orientation system can provide an indicator by flashing the headlights (or other lights) of the transportation vehicle and/or honking the horn of the transportation vehicle.

In addition to applying a threshold angle, the transportation orientation system may also apply a threshold distance. For example, the transportation orientation system can provide a distance indicator to the requester (e.g., by way of the requester client device) to convey how far away from the requester client device the transportation vehicle is located. The transportation orientation system may determine that the requester client device is within the threshold distance from the transportation vehicle and provide an indicator (e.g., a visual, auditory, or haptic alert) to the requester by way of the requester client device (and/or the transportation vehicle) that the requester client device is within the threshold distance.

Furthermore, as mentioned above, the transportation orientation system can dynamically modify a compass (or other indicators) as it detects changes in the location of the requester client device, the location of the transportation vehicle, and/or the orientation of the requester client device. For example, the transportation orientation system can detect when the requester client device is moving (e.g., when the requester is walking), when the transportation vehicle is moving, and/or when the requester client device is rotating (e.g., when the requester is turning to face different directions while searching for the transportation vehicle) and determine a modified direction between the requester and the transportation vehicle. Additionally, the transportation orientation system can provide an updated indicator to the requester by way of the requester client device.

As mentioned above, the transportation orientation system can also provide directional indicators to a provider of a transportation vehicle. For example, the transportation system can provide a digital compass to a provider by way of a provider client device that points in a direction from the transportation vehicle (e.g., the provider client device) to the requester client device relative to the orientation of the transportation vehicle. Likewise, the transportation orientation system can also apply a threshold angle and/or threshold distance with respect to the transportation vehicle and the provider client device. For instance, upon detecting that the transportation vehicle is oriented within a threshold angle (and/or threshold distance) of the transportation vehicle, the transportation orientation system can provide indicators such as a visual alert, an audio alert, and/or a haptic alert via the provider client device (and/or the requester client device).

The transportation orientation system described herein provides several advantages over conventional transportation systems. For instance, the transportation orientation system can provide indicators to a requester and/or provider that more effectively help the requester and provider initiate transportation services. For example, instead of providing only map information, the transportation orientation system can provide a digital compass to point the requester in the direction of the transportation vehicle relative to the current orientation of the requester client device to help the requester locate the transportation vehicle in a complex and/or unfamiliar environment (e.g., a crowded street crowded in a complex intersection).

As another advantage, the transportation orientation system can reduce the number of digital communications. To elaborate, the transportation orientation system can increase the likelihood that a requester will locate a transportation vehicle, and thereby decrease the likelihood that the requester (and/or the provider) will cancel the pickup request. With fewer pickup request cancelations and fewer ride requests that result from those cancelations, the transportation orientation system processes fewer communications to assign a transportation vehicle to pick up a requester who requests pickup after canceling a previous request.

Because the transportation orientation system results in fewer cancelations, the transportation orientation system further requires less processing time and less processing power than other systems. For example, because the transportation orientation system performs fewer matches to assign a transportation vehicle to pick up a requester, the transportation orientation system performs more quickly and uses less processing power than conventional systems. In addition, the transportation orientation system consumes less memory than some conventional systems due to the fact that a smaller amount of memory is required for the transportation orientation system to process a smaller number of communications and to match a smaller number of transportation vehicles to requesters who submit ride requests.

More detail regarding the transportation orientation system will now be provided with reference to the figures. For example, FIG. 1 illustrates a schematic diagram of an example environment for implementing a transportation orientation system 100 in accordance with one or more embodiments. An overview of the transportation orientation system 100 is described in relation to FIG. 1. Thereafter, a more detailed description of the components and processes of the transportation orientation system 100 is provided in relation to the subsequent figures.

As shown in FIG. 1, the transportation orientation system 100 includes (i.e., may be implemented by) a vehicle subsystem 102, server(s) 112, a requester client device 114 associated with a requester 118, and a network 120. For example, the transportation orientation system 100 can utilize the server(s) 112 to communicate with the vehicle subsystem 102 and/or the requester client device 114 via the network 120. The transportation orientation system 100 can communicate, by way of the network 120, amongst the server(s) 112, vehicle subsystem 102 and/or the requester client device 114 using an appropriate communications protocol. For example, the transportation orientation system 100 can utilize the provider client device 108 to detect a location of the provider client device 108, transmit the location of the provider client device 108 to the server(s) 112 (via the network 120), utilize the server(s) 112 (and the network 120) to transmit the location to the requester client device 114, and then utilize the requester client device 114 to generate and provide a directional indicator from the requester client device 114 to the transportation vehicle 104.

Although FIG. 1 illustrates the transportation orientation system 100 implemented across the vehicle subsystem 102, the server(s) 112, and the requester client device 114, the transportation orientation system 100 can be implemented in whole, or in part, by each of the vehicle subsystem 102, the server(s) 112, and/or the requester client device 114. For example, the transportation orientation system 100 can be implemented in whole by the requester client device 114 (e.g., the requester client device can detect pertinent orientations, directions, and locations and generate a directional indicator). Similarly, the transportation orientation system 100 can also be implemented by the provider client device 108 or the server(s) 112.

As used herein, a "vehicle subsystem" refers to a number of components within a vehicle system (e.g., the vehicle subsystem 102). For example, a vehicle subsystem can include, as mentioned above, a transportation vehicle (e.g., the transportation vehicle 104) and/or a provider client device (e.g., the provider client device 108). Thus, when referring to the transportation vehicle 104 performing a certain function herein, it will be appreciated that such disclosure includes the provider client device 108 performing the function. For example, in embodiments where the transportation orientation system 100 utilizes the transportation vehicle 104 to determine a location, determine an orientation, or provide an indicator, such description includes embodiments where the provider client device 108 performs these functions.

As used herein, the term "provider" refers to a driver or other individual person who operates a transportation vehicle (e.g., the transportation vehicle 104) and/or who interacts with a provider client device (e.g., provider client device 108). For instance, the term "provider" includes an individual that operates the transportation vehicle 104 along various routes to pick up and/or drop off requesters. The term "provider" also includes an individual who uses the provider client device 108 to navigate and to locate requester 118 for pickup. Alternatively, though not illustrated in FIG. 1, the vehicle the transportation vehicle 104 may be an autonomous vehicle—i.e., a self-driving vehicle that includes computer components and accompanying sensors requisite for driving without manual provider input from a human operator. Further, in some embodiments, a hybrid self-driving vehicle may include both self-driving functionality as well as some human operator interaction with (e.g., by provider 106), or independent of, the self-driving functionality. In other embodiments, the provider 106 may refer to an autonomous provider (e.g., a computer-based navigation and driving system) that acts as part of the transportation vehicle 104. Furthermore, the transportation vehicle 104 can include a device such as, for example, a GPS device or other locator device to determine the location of the transportation vehicle 104.

In one or more embodiments, the transportation vehicle 104 within the vehicle subsystem 102 refers to an automobile or other vehicle. The transportation vehicle 104 may be a car associated with the transportation orientation system 100. In cases where the transportation vehicle 104 is an autonomous vehicle, the transportation vehicle 104 may include additional components not depicted in FIG. 1 such as location components (e.g., as mentioned above), one or more sensors by which the autonomous vehicle navigates, and/or other components necessary to navigate without a provider (or with minimal interactions with a provider).

As mentioned, the vehicle subsystem 102 further includes a provider client device 108 associated with the provider 106. The provider client device 108 may be separate or integral to the transportation vehicle 104. For example, the provider client device 108 may refer to a separate mobile device such as, for example, a smartphone or tablet associated with the provider 106. Alternatively and/or additionally, the provider client device 108 may be a subcomponent of a vehicle computing system. The provider client device 108 may include various sensors such as a GPS locator, an inertial measurement unit, an accelerometer, a gyroscope, a magnetometer, and/or other sensors that the transportation orientation system 100 can access to obtain information.

In addition, the provider client device 108 includes thereon a provider transportation application 110. The provider transportation application 110 may be software or hardware or both. For instance, the transportation orientation system 100 can utilize the provider client device 108 to execute one or more functionalities of the provider transportation application 110 to navigate to a pickup location to pick up a requester, to collect fares, and/or to view a digital compass that points in the direction of the requester, as will be described in further detail hereafter.

In one or more embodiments, the transportation orientation system 100 determines location information from the vehicle subsystem 102. For instance, the transportation orientation system 100 identifies location information from a GPS device associated with the transportation vehicle 104 or the provider client device 108 and provides the location information to the server(s) 112 via the network 120. In addition, the transportation orientation system 100 can provide information to the vehicle subsystem 102 (e.g., from the server(s) 112 or the requester client device 114) to, for example, provide an indicator to the provider 106 by way of the provider client device 108 that the transportation vehicle 104 is within a threshold viewing angle of the requester 118.

As mentioned above, and as illustrated in FIG. 1, the transportation orientation system 100 can also be implemented by the requester client device 114 associated with the requester 118. As used herein, the term "requester" (e.g., the requester 118) refers to a passenger or other individual (or group of individuals) that has requested a ride from the transportation orientation system 100. A requester may refer to an individual that has requested a ride but is still waiting for pickup. A requester may additionally or alternatively refer to an individual that has already been picked up and that is currently riding within the transportation vehicle 104 on the way to a destination (e.g., a destination indicated by the requester 118).

Additionally, as used herein, the term "requester client device" (e.g., the requester client device 114) refers to a computing device associated with a requester (e.g., the requester 118). For instance, the term "requester client device" includes a mobile device such as, for example a smartphone or tablet associated with a requester (e.g., requester 118). For example, the requester 118 may interact with the requester client device 114 by way of the requester transportation application 116 installed thereon to request a ride from the server(s) 112. The transportation orientation system 100 can provide the requester 118, by way of the requester transportation application 116 on the requester client device 114, with a digital compass that points in the direction from the requester client device 114 to the transportation vehicle 104. Additionally, the requester transportation application 116 may provide information to the requester 118 such as an auditory alert, a visual alert, and/or a haptic alert, as will be described in further detail below.

While FIG. 1 illustrates a single requester client device 114 associated with a single requester 118, the transportation orientation system 100 can be implemented by multiple requester client devices each associated with a requester. As further illustrated in FIG. 1, the transportation orientation system 100 may also be implemented by the server(s) 112.

The server(s) 112 may generate, store, receive, and transmit any type of data, such as location information (in the location database 113) or orientation information. For example, the server(s) 112 may transmit data to a client device, such as the requester client device 114 and/or the provider client device 108. For example, the server(s) may communicate with the requester client device 114 to receive or access information such as location information, orientation information, or other information. Furthermore, the server(s) 112 can communicate with the requester client device 114 via the network 120 to transmit information to provide location updates of the transportation vehicle 104 and/or to provide a digital compass or other indicator to the requester 118 by way of the requester client device 114. The server(s) 112 can also transmit electronic messages between one or more client device. In one example embodiment, the server(s) 112 comprise a content server. The server(s) 112 can also comprise a communication server or a web-hosting server. Additional details regarding the server(s) 112 will be discussed below with respect to FIG. 13.

As mentioned, in one or more embodiments, the server(s) 112 can include all, or a portion of, the transportation orientation system 100. Specifically, the transportation orientation system 100 can comprise an application running on the server(s) 112 or a portion of a software application that can be downloaded from the server(s) 112. For example, the transportation orientation system 100 can include a web hosting application that allows the requester client device 114 and the vehicle subsystem 102 to interact with content hosted at the server(s) 112. To illustrate, in one or more embodiments, the requester client device 114 and/or the provider client device 108 can access a webpage supported by the server(s) 112. For instance, the requester client device 114 and/or the provider client device 108 can run an application to allow a user to access, view, and/or interact with a webpage or web site hosted at the server(s) 112.

In some embodiments, though not illustrated in FIG. 1, the transportation orientation system 100 may have a different arrangement of components and/or may have a different number or set of components altogether. For example, the requester client device 114 and the provider client device 108 can communicate directly, bypassing the server(s) 112 and/or the network 120.

Figure 2:
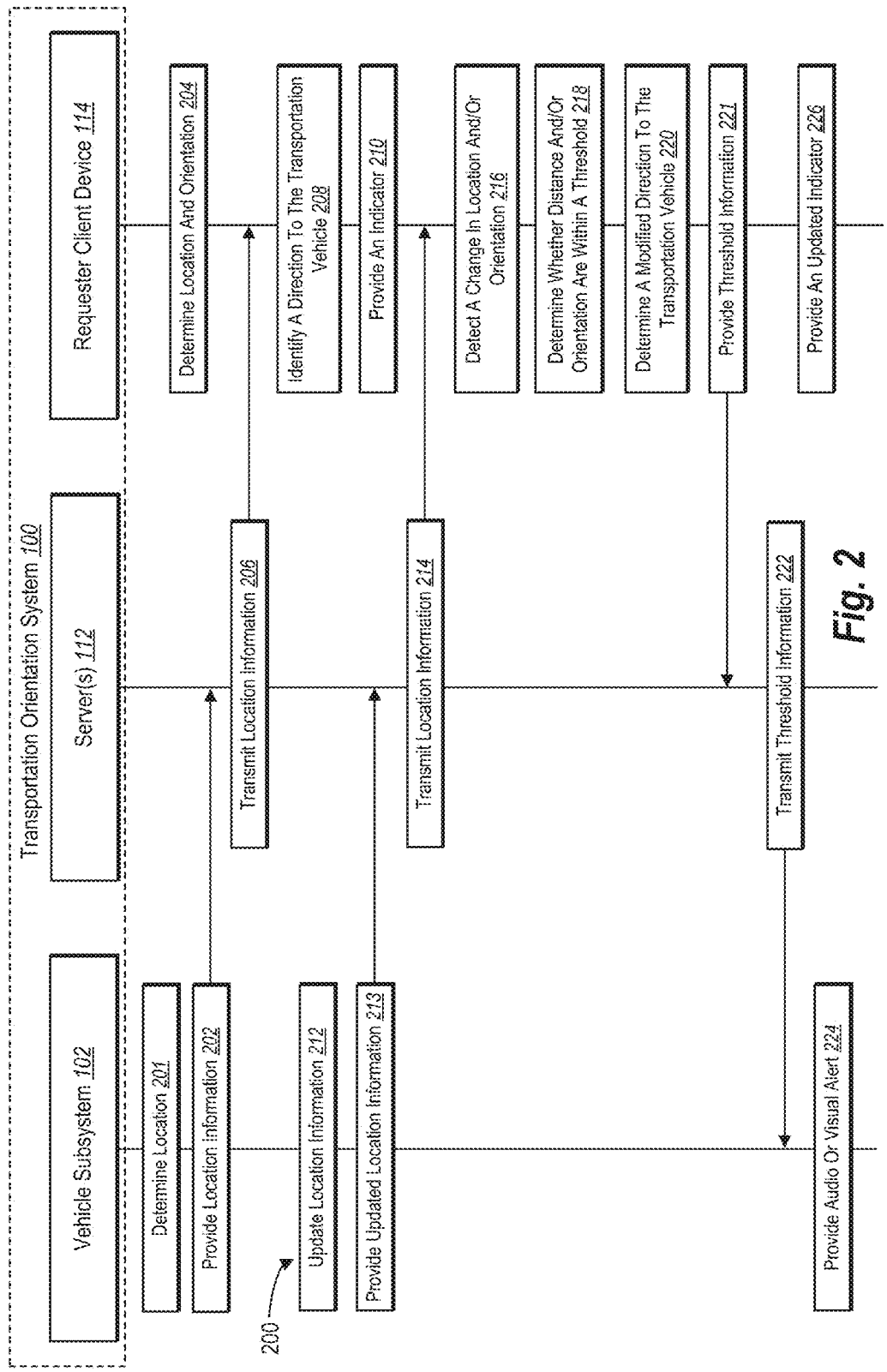
FIG. 2 illustrates a sequence diagram for providing an indicator of a direction from a requester client device to a transportation vehicle in accordance with one or more embodiments.

Turning now to FIG. 2, additional detail will be provided regarding generating and providing a directional indicator in accordance with one or more embodiments of the transportation orientation system 100. Specifically, FIG. 2 illustrates a sequence 200 of acts 202-226 performed by the transportation orientation system 100. As just discussed, FIG. 2 illustrates that the transportation orientation system 100 can reside in part on the vehicle subsystem 102, the server(s) 112, and/or the requester client device 114. In particular, as discussed in more detail below, the transportation orientation system 100 can include computer-executable instructions that, when executed by the vehicle subsystem 102 (e.g., the provider client device 108), the server(s) 112, and/or the requester client device 114 cause the vehicle subsystem 102, the server(s) 112, and/or the requester client device 114 to perform the acts 202-226 shown in the sequence diagram of FIG. 2. While FIG. 2 illustrates a particular order or sequence from the acts depicted therein, the acts 202-226 may be performed in an alternative order, may be performed by a different actor (e.g., the vehicle subsystem 102, the server(s) 112, and the requester client device 114), and/or may further include additional or alternative acts as well.

As shown in FIG. 2, the transportation orientation system 100, via the vehicle subsystem 102, performs the act 201 to determine the location of the vehicle subsystem 102. For instance, the vehicle subsystem 102 utilizes a GPS device associated with the provider client device 108 to determine the location of the transportation vehicle 104. Alternatively, the vehicle subsystem 102 uses a magnetometer, a gyroscope, and/or an accelerometer associated with the provider client device 108 to determine the location of the transportation vehicle 104.

In addition, the transportation orientation system 100, via the vehicle subsystem 102, performs the act 202 of providing location information to the server(s) 112. As mentioned above, the vehicle subsystem 102 communicates with the server(s) 112 via the network 120 to provide location information. For instance, in relation to FIG. 2, the vehicle subsystem 102 gathers location information by way of the transportation vehicle 104 and/or the provider client device 108. To illustrate, in some embodiments, the vehicle subsystem 102 utilizes a GPS device associated with the transportation vehicle 104 to determine a location of the transportation vehicle 104.

In addition, FIG. 2 illustrates that transportation orientation system 100, via the requester client device 114, performs the act 204 of determining a location and an orientation. To determine a location of the requester client device 114, the requester client device 114 accesses a GPS device or other component of the requester client device 114 to determine geographical coordinates (e.g., a latitude and a longitude) of the requester client device 114.

To determine an orientation of the requester client device 114, the requester client device 114 accesses a component of the requester client device 114 such as, for example, one or more inertial measurement units, magnetometers, gyroscopes, and/or accelerometers. As used herein, the term orientation refers to a direction in which an individual (e.g., requester 118), a device (e.g., requester client device 114 or provider client device 108), or a vehicle (e.g., transportation vehicle 104) is facing. For example, the orientation of the requester client device 114 refers to the direction in which the requester client device 114 is facing—i.e., the direction of a vector from the bottom of the requester client device 114 to the top of the requester client device 114. Likewise, the orientation of the provider client device 108 refers to the direction in which the provider client device 108 (and/or the transportation vehicle 104) is facing.

As shown in FIG. 2, in response to receiving the location information from the vehicle subsystem 102, the server(s) 112 perform the act 206 of transmitting the location information to the requester client device 114. To transmit the location information, the server(s) 112 communicate with the requester client device 114 via the network 120 using an appropriate communications protocol. By transmitting the location information to the requester client device 114, the server(s) 112 provide information to help the requester client device 114 determine a direction from the requester client device 114 to the transportation vehicle 104.

Indeed, as shown in FIG. 2, based on receiving the location information provided by the vehicle subsystem 102 and transmitted through the server(s) 112, the requester client device 114 performs the act 208 and identifies a direction to the transportation vehicle 104. For example, the requester client device 114 identifies a direction from the location of the requester client device 114 to the location of the transportation vehicle 104 (e.g., as determined by the locator device associated with the transportation vehicle 104 or the locator device associated with the provider client device 108, as discussed above).

To identify the direction from the requester client device 114 to the transportation vehicle 104, the requester client device 114 compares the geographic coordinates (e.g., latitude and longitude) of the requester client device 114 and the transportation vehicle 104. For example, the requester client device 114 determines a difference between the latitude of the requester client device 114 and the transportation vehicle 104, and further determines a different between the longitude of the requester client device 114 and the transportation vehicle 104. Thus, the requester client device 114 determines a straight-line trajectory between the requester 118 and the transportation vehicle 104.

Based on identifying the direction from the requester client device 114 to the transportation vehicle 104, the requester client device 114 further determines an angle for a digital compass to point from the location of the requester client device 114 to the location of the transportation vehicle 104 relative to the orientation of the requester client device 114. To that end, the requester client device 114 performs a number of calculations based on the location of the requester client device 114, the location of transportation vehicle 104, and the orientation of the requester client device 114. For instance, the requester client device 114 calculates an angle that is formed between a vector that originates at the location of the requester client device 114 and points toward a reference direction (e.g., magnetic north) and another vector that originates at the location of the requester client device 114 and points toward the location of the transportation vehicle 104.

In addition, the requester client device 114 calculates an angle that is formed between a vector that originates at the location of the requester client device 114 and that points toward the reference direction (e.g., magnetic north) and another vector that originates at the location of the requester client device 114 and that points in the direction that the requester client device 114 is oriented (e.g., the orientation of the requester client device 114). Considering the two calculated angles, the requester client device 114 further calculates a difference between the first angle and the second angle—i.e., the requester client device 114 determines a difference between (1) the angle between (a) the vector originating at the location of the requester client device and pointing toward magnetic north and (b) the vector originating at the location of the requester client device and pointing toward the location of the transportation vehicle and (2) the angle between (a) the vector originating at the location of the requester client device and pointing toward magnetic north and (b) the vector originating at the location of the requester client device and pointing in the orientation of the requester client device. Additional detail regarding the calculations involved in identifying the direction from the requester client device 114 to the transportation vehicle 104 relative to the orientation of the requester client device 114 is provided below with reference to FIG. 5.

Thus, the requester client device 114 determines an offset angle necessary to alter the direction that a digital compass points—i.e., to point in the direction of the transportation vehicle 104. For example, if a digital compass default position is toward the top of a display screen of the requester client device 114, the transportation orientation system 100 can calculate the offset angle as the difference between the orientation of the requester client device 114 and the direction toward the transportation vehicle 104. In other circumstances (e.g., where the default direction is magnetic north), to offset the direction that the compass points, the requester client device 114 calculates the offset angle from magnetic north to point toward the transportation vehicle 104.

As illustrated in FIG. 2, the sequence 200 further includes an act 210 whereby the transportation orientation system 100 utilizes the requester client device 114 to provide an indicator. As used herein, an indicator refers to a visual element, an auditory alert, or a haptic alert. To elaborate, an indicator may refer to a digital compass that points in a particular direction and that is provided to the requester 118 by way of a display associated with the requester client device 114 (e.g., via requester transportation application 116). Additionally or alternatively, an indicator may refer to a sound that emanates from a speaker of the requester client device 114, or may refer to a vibration caused by a rumble element (e.g., an off-balance electromagnetic motor) of the requester client device 114. Moreover, an indicator may refer to a sound such as, for example, a honking horn that emanates from the transportation vehicle 104. An indicator may also refer to a series of flashing lights (e.g., headlights or taillights of the transportation vehicle 104, or a flashlight of the requester client device 108). An indicator may further refer to a flashing vehicle-specific identification device (e.g., LYFT AMP) to flash colors specific to the matched transportation ride between the requester client device 114 and the transportation vehicle 104.

Indeed, in some embodiments, the transportation orientation system 100 provides a digital compass to the requester 118 by way of the requester client device 114. The requester client device 114 takes advantage of one or more magnetometers associated with the requester client device 114 to modify a default orientation of a digital compass. For instance, the requester client device 114 provides a digital compass that, instead of pointing to magnetic north relative to the orientation of the requester client device 114, points toward the transportation vehicle 104 relative to the orientation of the requester client device 114. Additional detail regarding the digital compass is provided below with reference to FIGS. 3 and 4.

Furthermore, as shown in FIG. 2, the transportation orientation system 100 also utilizes the vehicle subsystem 102 to perform the act 212 of updating location information associated with the vehicle subsystem 102 (e.g., the transportation vehicle 104 or the provider client device 108). To elaborate, the transportation vehicle 104 and/or the provider client device 108 updates location information by re-evaluating geographic coordinates. As an example, the provider client device 108 refreshes geographic coordinates by accessing GPS location information periodically at set intervals (e.g., every four seconds, every five seconds, etc.).

Upon refreshing the geographic coordinates or other location information, the vehicle subsystem 102 performs the act 213 to provide the updated location information to the server(s) 112 as illustrated in FIG. 2. Accordingly, the vehicle subsystem 102 may provide updated location information to the server(s) 112 frequently, over and over again, as the vehicle subsystem 102 continuously reevaluates the location of the transportation vehicle 104 and/or the provider client device 108. Thus, the server(s) 112 receive current location for the vehicle subsystem 102 on a consistent basis to, for example, detect a change in the location of the transportation vehicle 104 or the provider client device 108.

In response to receiving the updated location information, the server(s) 112 perform the act 214 of transmitting the location information to the requester client device 114, as illustrated in FIG. 2. Indeed, the server(s) 112 may transmit location information to the requester client device 114 at regular intervals as the server(s) 112 receive location information from the vehicle subsystem 102. In other embodiments, the server(s) 112 may only transmit location information to the requester client device 114 in response to detecting a change in the location of the transportation vehicle 104 or the provider client device 108 (e.g., a change in geographical coordinates).

As illustrated in FIG. 2, the transportation orientation system 100 performs, via the requester client device 214, the act 216 of detecting a change in location and/or orientation. To elaborate, the requester client device 114 detects a change in the location of the vehicle subsystem 102 (e.g., the transportation vehicle 104 or the provider client device 108) by comparing previously-received location information (e.g., from act 206) with the location information received from act 214 of FIG. 2.

Additionally, the requester client device 114 detects a change in location of the requester client device 114 by re-evaluating the location of the requester client device 114 in a fashion similar to the provider client device 108 as discussed above. For instance, the requester client device 114 updates location information by accessing GPS location information (e.g., as taken by a GPS device of the requester client device 114) periodically at set intervals or according to some other user-defined or system-defined rule. Accordingly, the requester client device 114 determines whether a more recent GPS location reading differs from a previous GPS location reading to detect a change in the location of the requester client device 114.

In addition, the requester client device determines a change in orientation of the requester client device 114. For instance, as described above, the requester client device 114 accesses information from one or more of an inertial measurement unit, magnetometer, a gyroscope, and/or an accelerometer to determine on orientation of the requester client device 114. The requester client device 114 may query or otherwise utilize these components frequently at set intervals to maintain a current orientation of the requester client device 114. To detect a change in the orientation, the requester client device 114 compares a previous orientation (e.g., as indicated by the magnetometer, gyroscope, and/or accelerometer) with a current orientation. Thus, the requester client device 114 detects a change in the location and/or orientation of the requester client device 114 as well as the transportation vehicle 104.

In alternative embodiments, the requester client device 114 determines a change of orientation by utilizing an application program interface ("API") of a mapping service to plot a first point location and a second point location along a path that the requester client device 114 (and/or the transportation vehicle 104) is moving. Upon plotting the first point and the second point, the requester client device 114 can interpolate the direction that the requester client device 114 (and/or the transportation vehicle 104) is moving and, in some embodiments, use the interpolated direction of movement as the orientation of the requester client device 114 (and/or the transportation vehicle 104).

As illustrated in FIG. 2, the transportation orientation system 100 can utilize the requester client device 114 to perform the act 218 of determining whether a distance and/or an orientation are within a threshold. To elaborate, in addition to determining a location of the requester client device 114 and a location of the vehicle subsystem 102, the requester client device 114 utilizes the location information to determine a distance between the requester client device 114 and the transportation vehicle 104. Furthermore, the requester client device 114 determines a threshold distance where, for example, the requester 118 would be able to see the transportation vehicle 104 (e.g., a set number of feet) or where the transportation vehicle 104 would be more obvious to the requester 118. Thus, when the requester client device 114 is within the threshold distance, the requester client device 114 may provide an indicator to the requester 118 that the requester client device 114 is within the threshold distance.

For instance, the requester client device 114 may provide a visual alert such as a portion of text or an image on a display of the requester client device 114 that the requester client device 114 is within the threshold distance. In addition, or as an alternative, the requester client device 114 may provide an auditory alert such as a beep, voice recording, or other sound that emanates from a speaker of the requester client device 114 to inform the requester 118 that the requester client device 114 is within the threshold distance of the transportation vehicle 104. Moreover, the requester client device 114 may additionally or alternatively provide a haptic alert such as, for example, a vibration from the requester client device 114 to alert the requester 118 that the requester client device 114 is within the threshold distance.

The transportation orientation system 100 can also utilize the requester client device 114 to provide an indication to the transportation vehicle 104 (e.g., to the provider 106 of the transportation vehicle 104 or to sensors of an autonomous transportation vehicle 104). For example, the transportation orientation system 100 can automatically initiate a flashlight of the requester client device 114 when the requester client device 114 is within the threshold distance of the transportation vehicle. To illustrate, the transportation orientation system 100 can turn a flashlight of the requester client device 114 on and off in a particular sequence (e.g., code) to signal the transportation vehicle 104.

Furthermore, as shown in FIG. 2, the transportation orientation system 100, via the requester client device 114, performs the act 218 of determining whether the orientation of the requester client device 114 is within a threshold angle of the transportation vehicle 104. To elaborate, the transportation orientation system 100 determines a threshold angle (e.g., an angle equivalent to an average human field of vision, fifteen degrees, forty-five degrees, or another angle within which, if the requester 118 is looking, the requester should be able to locate the transportation vehicle 104).

Based on the threshold angle, the requester client device 114 determines whether the orientation of the requester client device 114 (i.e., the direction in which the requester client device 114 is pointing) is within the threshold angle. By determining whether the orientation of the requester client device 114 is within the threshold angle, the requester client device 114 determines whether the transportation vehicle 104 is within a field of view of the requester 118. For instance, the requester client device 114 determines the orientation of the requester client device 114 as described above, and further determines whether a vector that originates at the location of requester client device 114 and that points in the orientation of the requester client device 114 is within the threshold angle.

Upon determining that the orientation of the requester client device 114 satisfies the threshold angle, the requester client device 114 provides one or more indicators to the requester (and/or the provider), as described above. For example, the requester client device 114 provides an indicator, such as visual alert in the form of a portion of text or an image to inform the requester 118 that the transportation vehicle 104 is within a field of view of the requester 118. As another example, the requester client device 114 provides an indicator in the form of an auditory alert such as a beep, a voice recording, or other sound or audio sample to the requester client device 114 to inform the requester 118 that the orientation of the client device 114 is within the threshold angle. As still another example, the requester client device 114 provides an indicator in the form of a haptic alert such as a vibration to inform the requester 118 that the orientation of the requester client device 118 is within the threshold angle. Additional detail regarding the threshold distance and threshold angle, including the indicators associated thereto, is provided below with reference to FIG. 7.

Moreover, as shown in FIG. 2, the transportation orientation system 100, via the requester client device 114, performs the act 220 of determining a modified direction to the transportation vehicle. For instance, upon detecting a change in the location of the requester client device 114, the location of the transportation vehicle 104, and/or the orientation of the requester client device 114, as discussed above, the requester client device 114 recalculates the direction from the requester client device 114 to the transportation vehicle 104. In this way, the requester client device 114 provides an updated indicator to the requester 118, as illustrated in act 226 of FIG. 2. In other words, the requester client device 114 performs the angle calculations described above (and in further detail below) to determine an updated offset angle to adjust the digital compass to point in the direction of the transportation vehicle 104. Accordingly, the requester client device 114 persistently updates the digital compass to keep the digital compass pointing in the direction of the transportation vehicle 104, regardless of movement of the requester client device 114 and/or the transportation vehicle 104.

As illustrated in FIG. 2, the transportation orientation system 100, via the requester client device 114, further performs act 221 to provide threshold information to the server(s) 112. For instance, the threshold information may include information that indicates whether the orientation of the requester client device 114 is within the threshold angle as well as information that indicates whether the requester client device 114 is within the threshold distance of the transportation vehicle 104. Moreover, the transportation orientation system 100 can also utilize the requester client device 114 to transmit location information to the server(s) 112. For instance, the transportation orientation system 100 can transmit the location of the requester client device 114 to the server(s) 112.

Upon receiving the threshold information, the server(s) 112 transmit the threshold information to the vehicle subsystem 102, as shown by act 222 within the sequence 200 of FIG. 2. Upon receiving the threshold information, the vehicle subsystem 102 provides an audio or visual alert, as illustrated in act 224 of FIG. 2. For instance, the transportation vehicle 104 of the vehicle subsystem 102 provides an audio alert by honking a horn to signal the requester 118, thereby making it easier for the requester 118 to locate the transportation vehicle 104. Additionally or alternatively, the transportation vehicle 104 provides a visual alert by flashing lights to help the requester 118 more easily locate and identify the transportation vehicle 104.

In the same or other embodiments, the provider client device 108 of the vehicle subsystem 102 provides an audio alert in the form of a beep or other sound to alert the provider 106 that the requester 118 is nearby or is within sight. The provider client device 108 may also provide a visual alert and/or a haptic alert to indicate to the provider 106 that the requester 118 is nearby or that the requester 118 is looking in the direction of the transportation vehicle 104. Upon receiving the alert, the provider 106 may search for the requester 118 to increase the likelihood of the requester 118 locating the transportation vehicle 104.

Although FIG. 2 illustrates particular devices performing the acts 202-226, in some embodiments, the acts 202-226 may be performed by others of the vehicle subsystem 102, the server(s) 112, and the requester client device 114. For instance, in at least one embodiment, the server(s) 112 may perform the act 204 to determine the location of the requester client device 114, the location of the transportation vehicle 104, and the orientation of the requester client device 114, in accordance with the above description.

Additionally, the server(s) 112 may perform the act 208 to identify a direction from the requester client device to the transportation vehicle 104. The server(s) 112 may also perform act 210 to provide an indicator to the requester 118 such as, for example, a digital compass. In addition, the server(s) 112 may perform the act 216 to detect a change in location and/or orientation of the requester client device 114 and/or the transportation vehicle 104. Furthermore, the server(s) 112 may perform the act 218 to determine whether the distance and/or orientation are within a respective threshold. The transportation orientation system 100 may also perform the act 220 to determine a modified direction to the transportation vehicle 104 in response to detecting a change in location and/or orientation, and may further perform the act 226 to provide an updated indicator (e.g., digital compass) accordingly.

Furthermore, as described above with respect to the requester client device 114 and the transportation orientation system 100, some of the acts 202-226 may be performed by the vehicle subsystem 102. For instance, acts 204, 208, 210, 216, 218, 220, and 226 may be performed by the vehicle subsystem 102 (e.g., by the transportation vehicle 104 or the provider client device 108). Indeed, in some embodiments, the vehicle subsystem 102 may determine a direction from the transportation vehicle 104 to the requester client device 114, and may provide a digital compass or other indicator to the provider 106 to indicate the direction from the transportation vehicle 104 to the requester client device 114.

Figure 3:
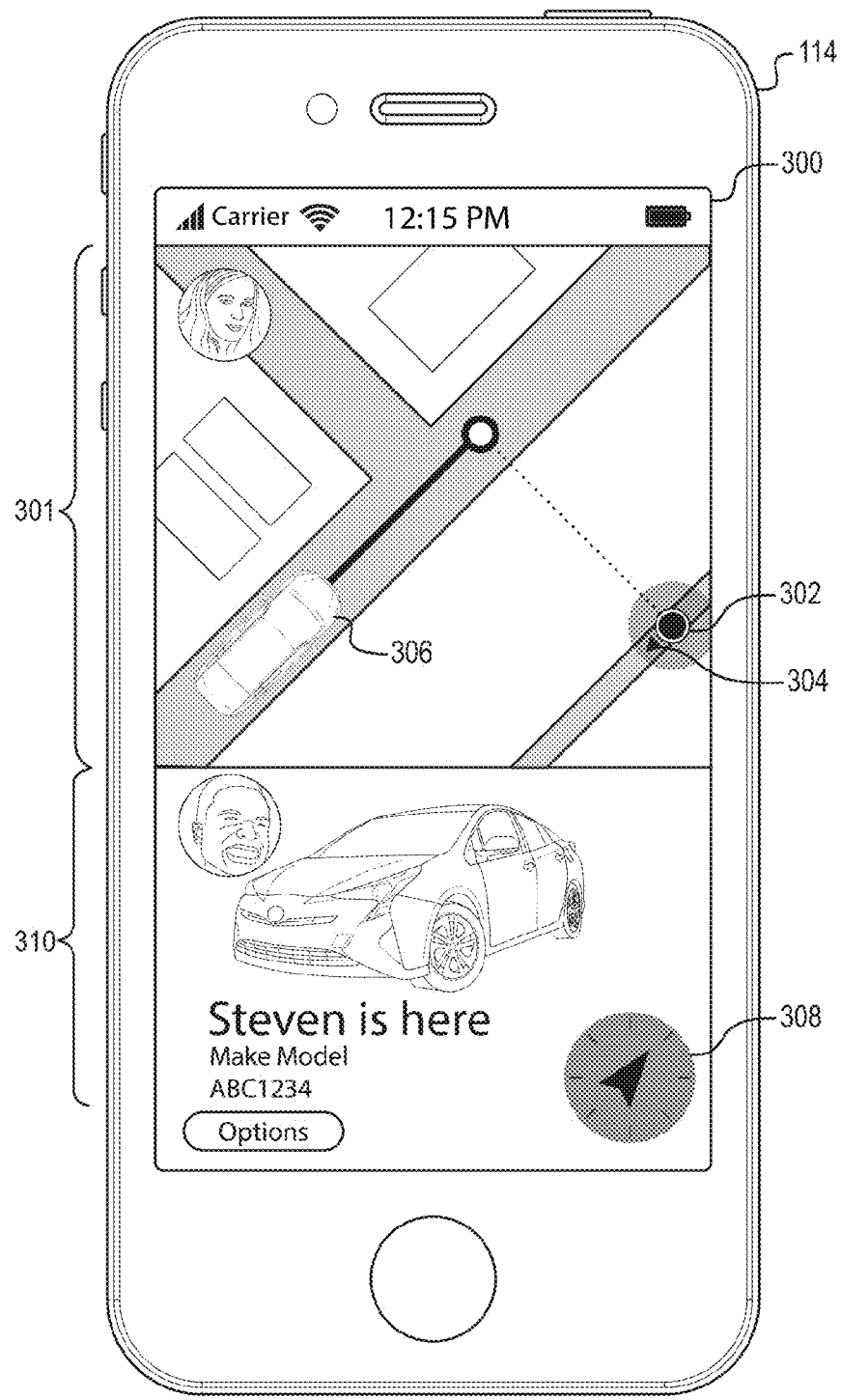
FIG. 3 illustrates an example requester client device displaying an example user interface in accordance with one or more embodiments.

As mentioned above, the transportation orientation system 100 can provide a user interface for displaying a directional indicator between a requester and transportation vehicle. For example, FIG. 3 illustrates an example requester client device 114 displaying a user interface 300 that includes a navigation pane 301 and an information pane 310. As illustrated in FIG. 3, the navigation pane 301 includes a top-down map that shows a location of the requester client device 114 and that further shows a location of the transportation vehicle 104. For instance, the navigation pane 301 shows a requester element 302 that indicates the location of the requester client device 114 within the map. The navigation pane 301 also shows a vehicle element 306 that indicates the location of the transportation vehicle 104 on the map.

In addition, the navigation pane 301 includes an orientation element 304 that indicates the orientation of the requester client device 114. For instance, given that the requester client device 114 orients the map within the navigation pane 301 to keep the upward direction (e.g., toward the top of the navigation pane 301) pointing north (e.g., magnetic north or true north), the orientation element 304 indicates that the requester client device 114 is pointing in a direction to the southwest. The navigation pane 301 may also include other user interface elements, such as an element to indicate a pickup location where the requester 118 is to meet the transportation vehicle 104 for pickup. Similarly, to help the requester 118 navigate to the pickup location, the navigation pane 301 may also display a requester navigation route to help the requester 118 navigate to the pickup location, and may further display a vehicle navigation route to indicate to the requester 118 a route that the transportation vehicle 104 is traveling to meet the requester 118 for pickup.

As further illustrated in FIG. 3, and as mentioned above, the user interface 300 includes an information pane 310. As shown, the information pane 310 displays information pertaining to the transportation vehicle 104 to help the requester 118 identify the transportation vehicle 104. Indeed, the information pane 310 of FIG. 3 displays information such as a profile picture associated with the provider 106, an image of the transportation vehicle 104 (or other vehicle of the same or similar make, model, and/or color), a make and model of the transportation vehicle 104, and/or a license plate number of the transportation vehicle 104. The information pane 310 also displays information pertaining to the status of the provider 106 and/or transportation vehicle 104 (e.g., "Steven is here") to indicate to the requester 118 where the transportation vehicle 104 is or what the transportation vehicle 104 is doing at a given point in time.

Furthermore, as illustrated in FIG. 3, the information pane 310 further includes a digital compass 308. As described above, the transportation orientation system 100 generates and provides (via the requester client device 114) the digital compass 308 to indicate to the requester 118 the direction to the transportation vehicle 104. Indeed, as illustrated in FIG. 3, the transportation orientation system 100 generates the digital compass 308 to point in a direction from the requester client device 114 toward the location of the transportation vehicle 104 relative to the orientation of the requester client device 114. Specifically, the requester client device 114 is at the location indicated by the requester element 302 and oriented in the direction indicated by the orientation element 304. Therefore, to point the digital compass 308 in the direction of the transportation vehicle 104, as indicated by the vehicle element 306, the digital compass 308 points in a direction up and to the right.

As used herein, an upward compass direction refers to a forward travel direction (i.e., a direction from the bottom of the requester client device 114 to the top of the requester client device 114 if the requester client device 114 is laid flat and the display of the client device 114 is facing the requester). Likewise, a downward compass direction refers to a backward travel direction. Similarly, a right-pointing compass direction refers to a travel direction to the right, where a left-pointing compass direction refers to a travel direction to the left.

To illustrate, since the requester client device 114 is located at the location indicated by the requester element 302, and since the requester client device 114 is oriented in the direction indicated by the orientation element 304, and further since the transportation vehicle 104 is located at the location indicated by the vehicle element 306, the direction change required for the requester 118 to navigate straight from the current location of the requester client device 114 to the transportation vehicle 104 is slightly to the right (e.g., around 45 degrees from the current orientation). Therefore, the requester client device 114 points the digital compass 308 as shown in FIG. 3 to indicate the direction toward the transportation vehicle 104.

While FIG. 3 illustrates the digital compass 308 within the information pane 310, in some embodiments the digital compass 308 may be located elsewhere within the user interface 300. For example, the digital compass 308 may be located within the navigation pane 301. In other embodiments, the digital compass 308 may be hidden from view within a menu such that the requester client device 114 only displays the digital compass 308 in response to detecting a selection of an icon, option, or button within the menu to access the digital compass 308.

Furthermore, while FIG. 3 illustrates that the transportation vehicle 104 has not yet arrived at a pickup location, in some embodiments, the requester client device 114 only displays the digital compass 308 in response to detecting that the transportation vehicle 104 has arrived at the pickup location. For instance, the requester client device 114 may receive information or otherwise determine that the transportation vehicle 104 is stopped at or near (e.g., within a threshold distance of) the pickup location and may, in response, provide the digital compass 308 to the requester 118. Upon detecting that the transportation vehicle 104 has arrived at the pickup location, the requester client device 114 may additionally or alternatively provide a selectable option to the requester 118 that, upon further detecting a user input to select the option, prompts the requester client device 114 to provide the digital compass 308 and/or other indicator(s).

Additionally, the digital compass 308 illustrated in FIG. 3 may be user-selectable. For instance, in response to detecting a selection (e.g., a finger tap, mouse click, etc.) the requester client device 114 may open a full-screen view of the digital compass 308, as discussed in further detail below with reference to FIG. 4. Furthermore, while FIG. 3 illustrate the digital compass 308 pointing in the direction of the transportation vehicle 104, in some embodiments, the digital compass 308 may be merely an icon of a digital compass that does not depict a current direction to the transportation vehicle 104, but is instead user-selectable to open a digital compass that points toward the transportation vehicle 104, as also discussed below with reference to FIG. 4.

Figure 4:
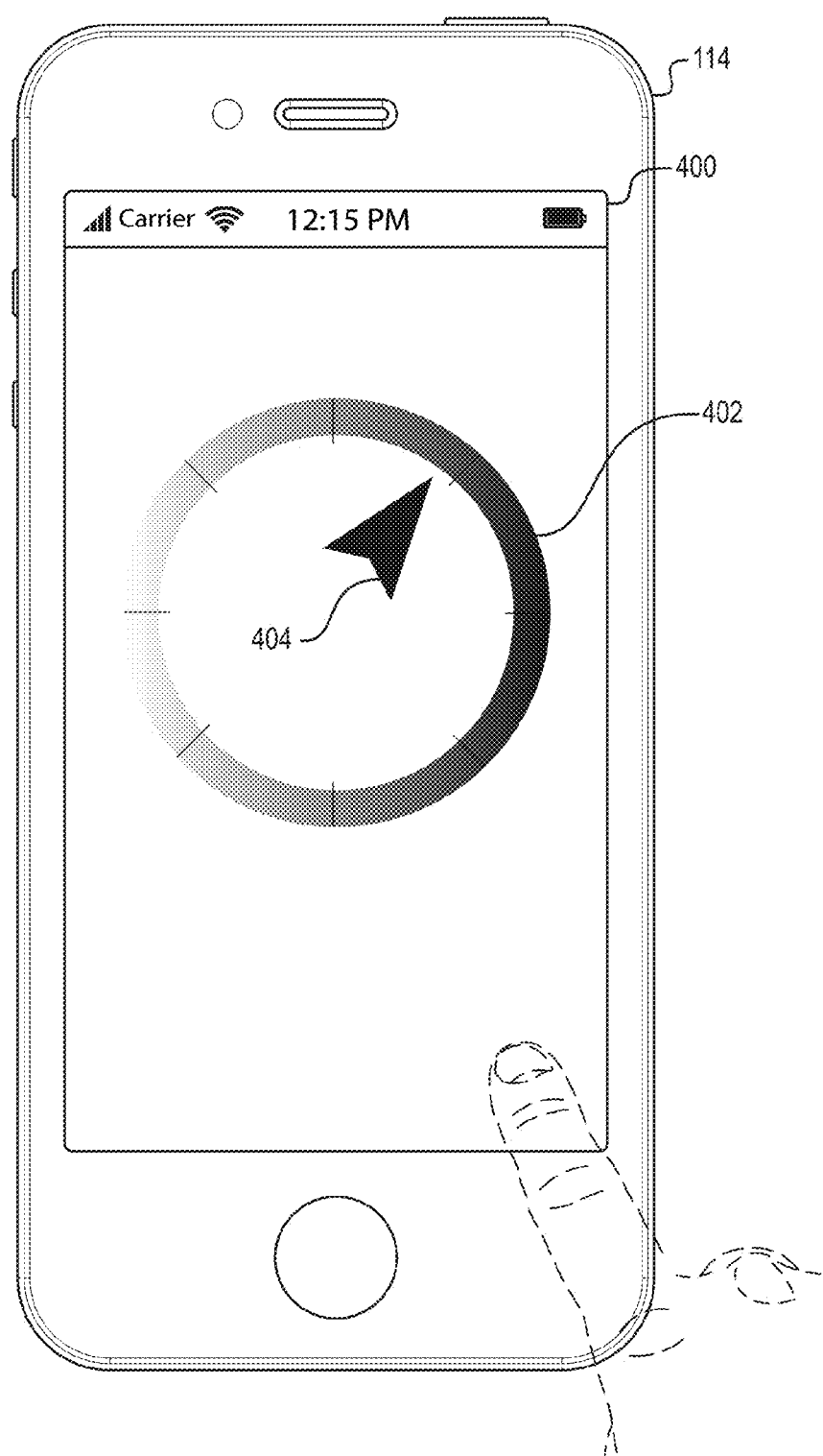
FIG. 4 illustrates an example requester client device displaying a user interface with a digital compass indicating the direction from the requester client device to the transportation vehicle in accordance with one or more embodiments.

As mentioned, FIG. 4 illustrates the requester client device 114 displaying a user interface 400 that includes a full-screen view of a digital compass 402. For instance, as shown in FIG. 4, the requester 118 may select the digital compass 308 from FIG. 3 to open the digital compass 402 of FIG. 4. Indeed, in some embodiments, the requester client device 114 may detect a user selection to open the digital compass 402, which user selection may include, but is not necessarily limited to, a finger tap, a stylus tap, a mouse click, etc. In the same or other embodiments, the requester client device 114 may maintain the full-screen view of the digital compass 402 so long as the requester 118 maintains the input (e.g., finger contact) with the screen of the requester client device 114. If the requester 118 lifts the finger or otherwise ceases the input, the requester client device 114 may return to a view like that depicted in FIG. 3, where the digital compass 308 is located within the user interface 300. In other embodiments, the requester client device 114 may open the user interface 400 that shows the full-screen view of the digital compass 402 in response to a single tap or other user input that is not necessarily held for an extended period. In these embodiments, the requester client device 114 may provide an option to close the user interface 400 including the digital compass 402 and/or to return to the user interface 300 illustrated in FIG. 3.

As illustrated in FIG. 4, the digital compass 402 is a larger version of the digital compass 308 of FIG. 3. That is to say, the digital compass 402 includes a needle 404 that points in the same direction as the digital compass 308. The requester client device 114 provides a full-screen view of the digital compass 402 to help the requester see the direction from the current location of the requester client device 114 to the transportation vehicle 104 more clearly. In addition, and in accordance with the above description, the digital compass 402 is dynamic. That is to say, the requester client device 114 updates the direction in which the needle 404 of the digital compass 402 points in real time (e.g., at periodic intervals).

Figure 5:
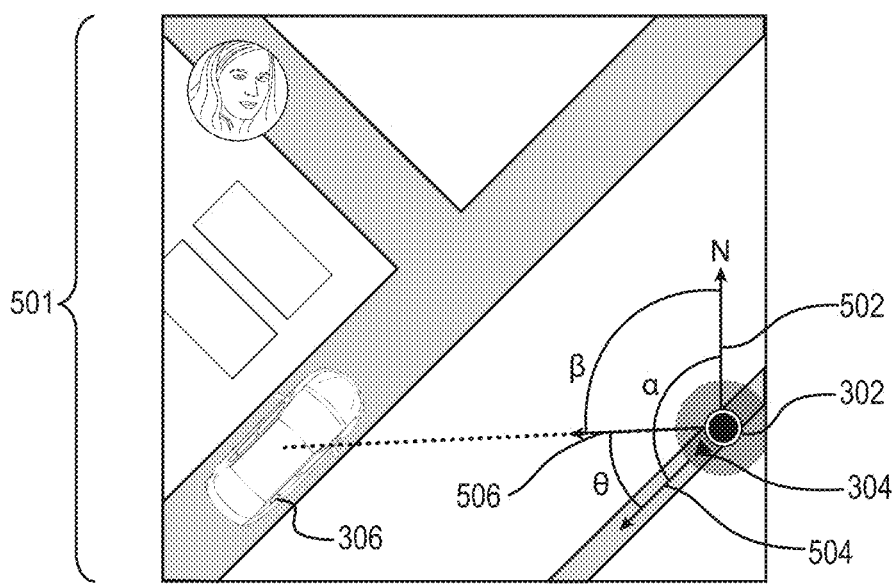
FIG. 5 illustrates an example illustration of vectors and angles for determining the direction from the requester client device to the transportation vehicle in accordance with one or more embodiments.

As mentioned above, the transportation orientation system 100 can determine an angle for a directional indicator (e.g., an offset angle for a digital compass) based on an orientation of a requester client device, a location of a transportation vehicle, and a location of a requester. FIG. 5 illustrates determination of a directional indicator in accordance with one or more embodiments. Specifically, FIG. 5 illustrates a navigation pane 501 similar to the navigation pane 301 of FIG. 3. However, the navigation pane 501 of FIG. 5 includes illustrations of mathematical elements that the requester client device 114 does not necessarily provide for display to the requester 114. It will be beneficial for the purposes of understanding and clarity, however, to describe the calculations that the requester client device 114 performs to provide a digital compass (e.g., the digital compass 308 and/or the digital compass 402). Accordingly, the navigation pane 501 of FIG. 5 includes the requester element 302 to show the location of the requester client device 114, the orientation element 304 to show the orientation of the requester client device 114, and the vehicle element 306 to show the location of the transportation vehicle 306.

Additionally, the navigation pane 501 includes three co-planar angles depicted as an angle α, an angle β, and an angle θ. With regard to FIG. 5, the angle θ reflects the difference between the orientation of the requester and the direction of the transportation vehicle (i.e., the offset angle). As illustrated, the transportation orientation system 100 determines the angle θ based on the angle α, and the angle β. Specifically, the transportation system 100 determines the angle θ as the difference between the angle α, and the angle β.

The transportation system 100 determines the angle α based on (i.e., as the difference between) two vectors: 1) a vector 502 that originates at the location of the requester client device 114, as indicated by the requester element 302, and that points northward (e.g., toward magnetic north), and 2) a vector 504 that originates at the location of the requester client device 114 and that points in the orientation of the requester client device 114, as indicated by the orientation element 304.

In addition, the transportation system 100 determines the angle β based on the vector 502 and a vector 506 that originates at the location of the requester client device 114 and that points in the direction of the transportation vehicle 104. The transportation system 100 can determines the vector 506 based on the location of the transportation vehicle (e.g., based on the location of a provider client device) and the requester (e.g., the location of the requester client device).

As shown, the angle θ is located between the vector 504 and the vector 506. Accordingly, the transportation orientation system 100 (e.g., via the requester client device 114) determines the angle θ as the difference between the angle α and the angle β. As a result, the requester client device 114 calculates an offset angle (e.g., angle θ) to manipulate a digital compass (e.g., digital compass 308 or digital compass 402) to point toward the location of the transportation vehicle 104.

More specifically, the transportation orientation system 100 utilizes the requester client device 114 (e.g., the magnetometer(s) associated with (e.g., housed within) the requester client device 114) to determine which direction is magnetic north. Additionally, the requester client device 114 also utilizes the gyroscope(s) and/or accelerometer(s) associated with the requester client device 114 to determine the orientation of the requester client device 114, as indicated by the orientation element 304. Upon determining magnetic north and the orientation of the requester client device 114, the requester client device 114 calculates the angle α by calculating a number of degrees or radians between the vector 502 and the vector 504.

Furthermore, the requester client device 114 determines the offset angle β—i.e., the angle between magnetic north and the vector 506 between the requester and the transportation vehicle. To illustrate, the requester client device determines the location of the requester from the requester client device 114 and the location of the transportation vehicle 104 from provider client device 108. Utilizing the location of the requester and the transportation vehicle, the transportation orientation system can determine the angle β (e.g., the inverse tangent of the difference in coordinates between the two positions).

Additionally, the requester client device 114 determines the angle θ. For instance, the requester client device 114 calculates a number of degrees or radians between the angle α and the angle β. In sum, because the requester client device 114 determines its own location (e.g., as indicated by the requester element 302) and orientation (e.g., as indicated by orientation element 304), and because the requester client device 114 further receives location information for the transportation vehicle 104, the requester client device 114 can extrapolate the information necessary to determine an angular difference between the orientation of the requester client device 114 and a straight line that extends from the requester client device 114 to the transportation vehicle 104. Thus, the requester client device 114 calculates the angle θ.

In some embodiments, the requester client device 114 provides the digital compass 308 that points toward the transportation vehicle 104 by using the angle θ as the offset angle. To elaborate, the transportation orientation system 100 can identify a default orientation client compass on the requester client device 114 that points in the direction of the orientation of the requester client device 114. The transportation orientation system 100 requester client device 114 can offset the digital compass from pointing in the orientation of the requester client device 114 to pointing toward the transportation vehicle 104 utilizing the angle θ. For instance, in these embodiments, the requester client device 114 uses its own orientation as a baseline and offsets the orientation by the angle θ to determine where to point the digital compass 308.

Figure 6:
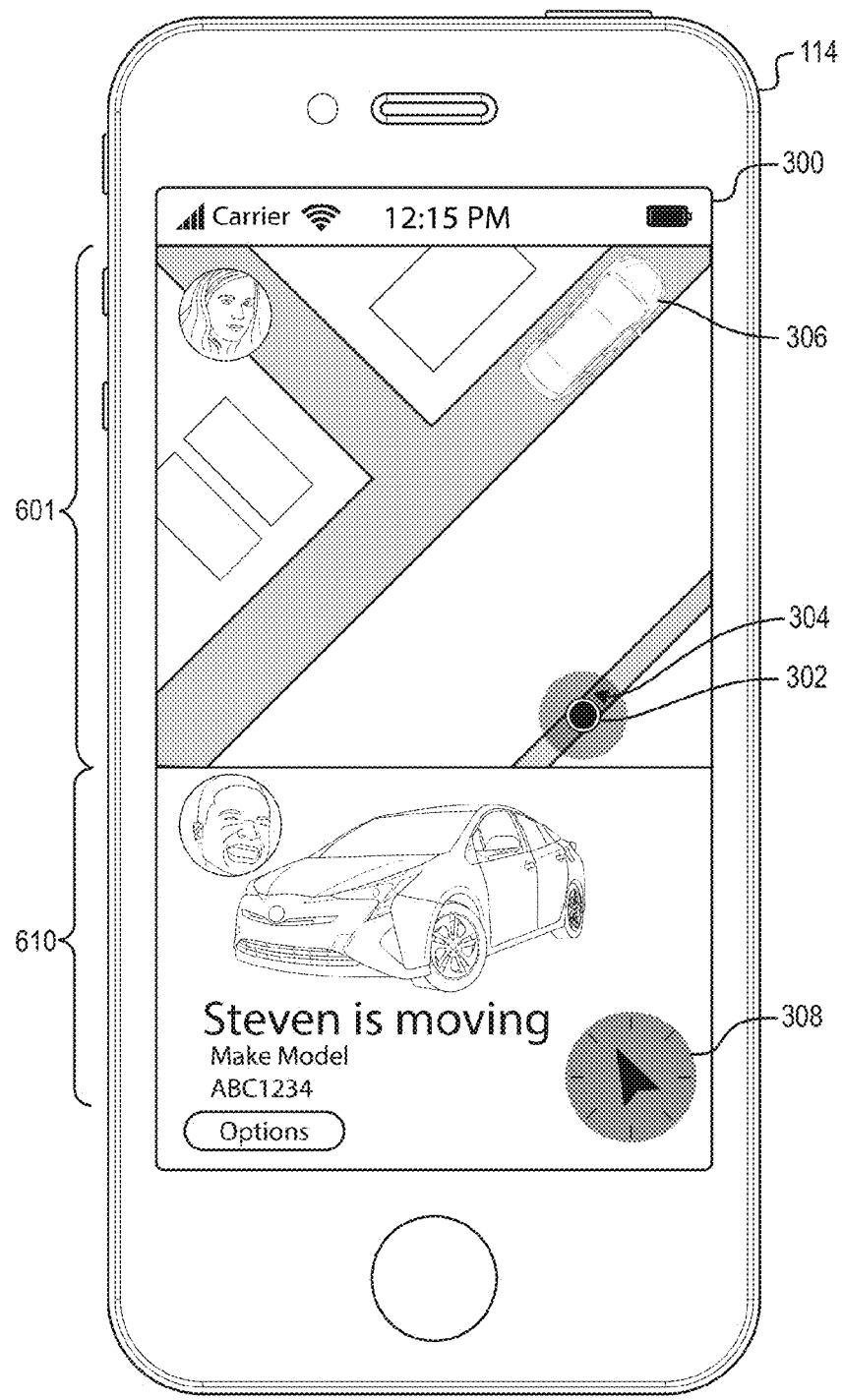
FIG. 6 illustrates an example requester client device displaying another example user interface in accordance with one or more embodiments.

As mentioned above, the transportation orientation system 100 can also dynamically update a directional indicator between a requester and transportation vehicle. For instance, FIG. 6 illustrates modifying a digital compass in response to changes in orientation of a requester client device, changes in location of a requester client device, or changes in location of a transportation vehicle. Specifically, FIG. 6 illustrates the requester client device 114 displaying the user interface 300 that includes a navigation pane 601 and an information pane 610. The navigation pane 601 includes elements similar to those of navigation pane 301 in FIG. 3. However, navigation pane 601 in FIG. 6 illustrates the requester element 302 and the vehicle element 306 in different locations within FIG. 6 than in FIG. 3. Indeed, as described above, the transportation orientation system 100 (e.g., via the requester client device 114) detects a change in location of the requester client device 114, a change in location of the transportation vehicle 104, and/or a change in orientation of the requester client device 114.

As illustrated in FIG. 6, the requester client device 114 is in a different location than is depicted in FIG. 3, as shown by the requester element 302. In addition, the transportation vehicle 104 is in a different location than is depicted in FIG. 3, as shown by vehicle element 306. Furthermore, the orientation of the requester client device 114 is in a different direction than is depicted in FIG. 3, as shown by orientation element 304. As described above, the transportation orientation system 100 detects changes in location and/or orientation by accessing GPS location information and/or information related to other components such as magnetometers, gyroscopes, and accelerometers (e.g., via the requester client device 114 and/or the provider client device 108).

In response to detecting changes in location and/or orientation, the transportation orientation system 100 (e.g., via the requester client device 114) updates the digital compass 308 to generate the digital compass 608 which points in the direction of the transportation vehicle 104. Indeed, as illustrated in FIG. 6, the transportation orientation system 100 generates and provides the digital compass 608, which points slightly to the left of the upward direction (toward the transportation vehicle 104 relative to the orientation of the requester 118).

Thus, FIG. 6 illustrates one example embodiment of dynamically generating a modified compass. Specifically, comparing the direction of the digital compass 308 in FIG. 3 to the direction of the digital compass 608 in FIG. 6, the digital compass 608 portrays a modified direction that corresponds to the modified location of the transportation vehicle 104 relative to the requester 118.

As further illustrated in FIG. 6, the user interface 300 displays the information pane 610, which includes information that is slightly different than the information shown in information pane 310 of FIG. 3. For instance, because the transportation orientation system 100 detects that the transportation vehicle 104 is moving, the transportation orientation system 100 provides (e.g., via the requester client device 114) information to indicate to the requester 118 that the transportation vehicle is moving (e.g., "Steven is moving"). Accordingly, if the requester 118 notices that the digital compass 308 (and 608) keeps changing directions even while the requester 118 is standing still, the requester 118 will know why (because the transportation vehicle 104 is constantly changing locations as it moves).

Although FIG. 6 depicts the indicator that the transportation vehicle 104 is moving within the information pane 610, in some embodiments, the indicator that the transportation vehicle is moving may be in the navigation pane 601 or may be a pop-up notification or some other indicator. Furthermore, the indicator that the transportation vehicle 104 is moving may be in the form of an audio alert that tells the requester 118 by way of a speaker associated with the requester client device 114 that the transportation vehicle 104 is moving.

Figure 7:
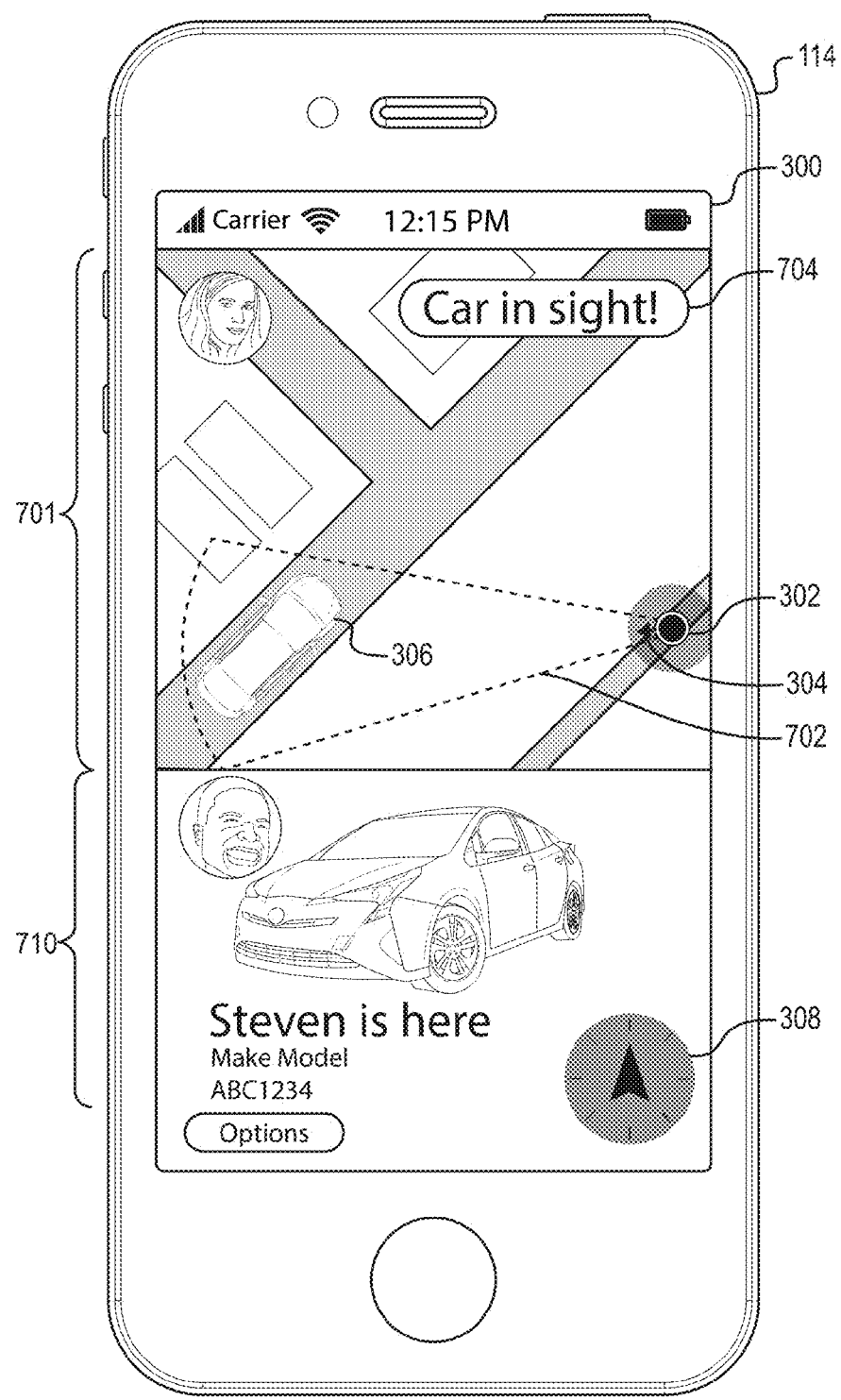
FIG. 7 illustrates an example requester client device displaying another example user interface in accordance with one or more embodiments.

As mentioned above, the transportation orientation system 100 can apply an angle threshold and generate an indicator upon detecting satisfaction of the angle threshold. For example, FIG. 7 illustrates application of an angle threshold to generate an indicator in accordance with one or more embodiments of the transportation orientation system 100. Specifically, FIG. 7 illustrates the transportation orientation system 100 (e.g. via the requester client device 114) displaying the user interface 300 including a navigation pane 701 and the information pane 710. For instance, the navigation pane 701 in FIG. 7 includes the requester element 302, the orientation element 304, and the vehicle element 306, as described above. The navigation pane 701 of FIG. 7 further includes a threshold angle element 702 and a threshold angle indicator 704. In some embodiments, the transportation orientation system 100 may provide the threshold angle element 702 as a visible element within the navigation pane 701, while in other embodiments the transportation orientation system 100 may not provide the threshold angle element 702 as a visible element, but may instead provide only the threshold angle indicator 704. In either case, the transportation orientation system 100 applies a threshold angle to detect when the requester client device 114 is oriented toward the transportation vehicle 104.

To illustrate, in one or more embodiments, the transportation orientation system 100 determines a threshold angle. In some embodiments, the threshold angle is predefined to be a specific number of degrees or radians (e.g., an average field of view angle for a person). In other embodiments, the requester 118 may set the threshold angle via user input. In still other embodiments, the requester client device 114 may determine the threshold angle based on a number of factors such as, for example, time of day (e.g., larger threshold angle in the day, narrower threshold angle at night), brightness of the surrounding environment, amount of traffic (e.g., larger threshold angle with less traffic, smaller threshold angle with higher traffic), geographic location (e.g., lower threshold angle in an area with a higher population or a history of dropped requesters), visibility from the requester's location, age of the requester 118, size of the transportation vehicle 104, etc.

As shown in FIG. 7, the requester client device 114 determines the threshold angle from the location of the requester client device 114, as illustrated by threshold angle element 702. As shown, the threshold angle element 702 includes two vectors that each originate at the requester element 302 (and centered on the orientation of the requester client device 114). In addition, the vehicle element 306 is located between the two vectors that make up the threshold angle.

The requester client device 114 determines that the orientation of the requester client device 114 is within the threshold angle. In response to detecting that the orientation of the requester client device 114 is within the threshold angle, the transportation orientation system 100 provides a threshold angle indicator 704 (e.g., a visual alert "Car in sight!"). Although FIG. 7 illustrates a visual alert, in some embodiments the threshold angle indicator 704 may be an audio alert and/or a haptic alert as described above.

Furthermore, the transportation orientation system 100 may provide an indicator to the provider client device 108 in response to detecting that the requester client device 114 is oriented within the threshold angle. For example, the transportation orientation system 100 may provide a visual alert (e.g., "Sarah is looking in your direction"), a haptic alert, and/or an audio alert to the provider 106 via the provider client device 108 in response to detecting that the requester client device 114 satisfies the threshold angle.

Although not illustrated in FIG. 7, the navigation pane 701 may further include a threshold distance element and a threshold distance indicator. As discussed above, the threshold distance element may illustrate a threshold distance within the navigation pane 701. Additionally, upon detecting that the requester client device 114 and the transportation vehicle 104 are within the threshold distance, the transportation orientation system 100 (e.g., via the requester client device 114) may display the requester element 302 within the threshold distance element of the vehicle element 306.

The requester client device may further provide a threshold distance indicator in the form of a visual alert (e.g., "Car is nearby"), audio alert, and/or haptic alert, as described above.

FIGS. 3-7 illustrate user interfaces generated by the transportation orientation system 100 for the requester client device 114. In the same or other embodiments, however, the transportation orientation system 100 can also perform similar functions and provide similar user interfaces from the perspective of the provider client device 108.

Figure 8:
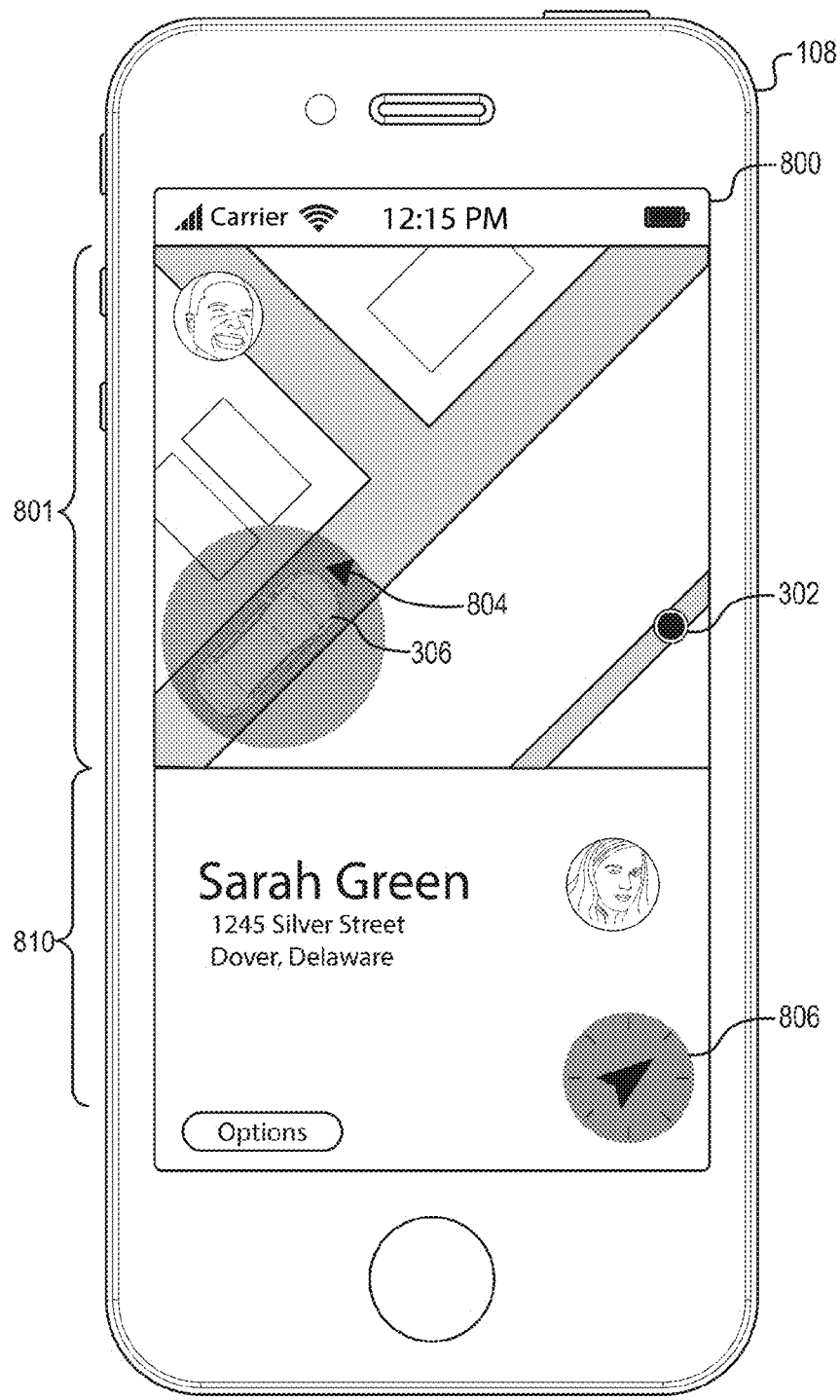
FIG. 8 illustrates an example provider client device displaying an example user interface in accordance with one or more embodiments.

For example, FIG. 8 illustrates generating a directional indicator with respect to a provider client device. Specifically, FIG. 8 illustrates the provider client device 108 displaying a user interface 800 for presentation to the provider 106, where the user interface 800 includes a navigation pane 801 and an information pane 802. The navigation pane 801 includes the requester element 302 as described above, as well as the vehicle element 306 as described above. In addition, the navigation pane 801 provides an orientation element 804 to indicate the orientation of the provider client device 108 and/or the transportation vehicle 104. For instance, the provider client device 108 accesses a magnetometer, gyroscope, and/or accelerometer associated with the provider client device 108 and/or the transportation vehicle 104 to determine the orientation. The provider client device 108 provides the orientation element 804 to indicate the determined orientation.

Though not illustrated in FIG. 8, the provider client device 108 may additionally perform the functions described above with respect to the requester client device 114 through the description of FIGS. 3-7. For instance, the provider client device 108 provides the information pane 802 including information relating to the requester 118 such as, for example, a profile picture of the requester 118, a name of the requester 118, a pickup location address, and/or other profile information.

Additionally, the as illustrated in FIG. 8, the provider client device 108 provides a digital compass 806 to the provider 106. For instance, the transportation orientation system 100 (e.g., via the provider client device 108) determines a direction from the provider client device 108 and/or transportation vehicle 104 toward the requester client device 114. As described above with respect to the requester client device 114, the transportation orientation system 100 (e.g., via the provider client device 108) determines an offset angle to offset the digital compass 806 to point to the requester client device 114 instead of toward a baseline reference direction. Indeed, the digital compass 806 of FIG. 8 points in the direction toward the requester element 302 from the forward direction indicated by orientation element 804.

Furthermore, the transportation orientation system 100, via the provider client device 108, may determine a threshold angle and/or a threshold distance. For instance, the provider client device 108 may determine a location and an orientation of the provider client device 108 and/or transportation vehicle 104 as well as the location of the requester client device 114. Using this information, the transportation orientation system 100, by way of the provider client device 108, determines an offset angle to provide a digital compass (e.g., digital compass 806) to point in the direction of the requester client device 114. Additionally, the transportation orientation system 100 determines a threshold angle similar to the threshold angle described above with reference to FIG. 7, except where the threshold angle originates at the location of transportation vehicle 104 and centers around the location of the requester client device 114 as indicated by requester element 302.

When transportation orientation system 100 detects that the provider client device 108 and/or the transportation vehicle 104 are oriented within the threshold angle, the transportation orientation system 100 provides an indication to the provider 106 and/or the requester 118. For instance, the transportation orientation system 100 provides a visual alert to the provider 106 by way of the provider client device 108 (e.g., "You are looking toward Sarah") that the transportation vehicle 104 is oriented in the direction of the requester client device 114. The transportation orientation system 100 may also or alternatively provide a haptic alert and/or an audible alert, as described above.

Additionally, the transportation orientation system 100 may provide an indicator to the requester 118 by way of the requester client device 114 when the transportation vehicle 104 satisfies the threshold angle. As an example, the transportation orientation system 100 may provide a visual alert (e.g., "Your LYFT is facing you!"), a haptic alert, and/or an audio alert to the requester 118 by way of the requester client device 114, as described above.

In addition to determining the threshold angle and the threshold distance, the provider client device 108 may further detect whether the orientation of the provider client device 108 or the transportation vehicle 104 is within the threshold angle. The provider client device 108 may further provide an indicator to the provider 106 in response to detecting that the provider client device 108 is oriented within the threshold angle and/or in response to detecting that the provider client device 108 is located within the threshold distance. As described above, the indicator may include one or more of a visual alert, an audio alert, and/or a haptic alert.

Figure 9:
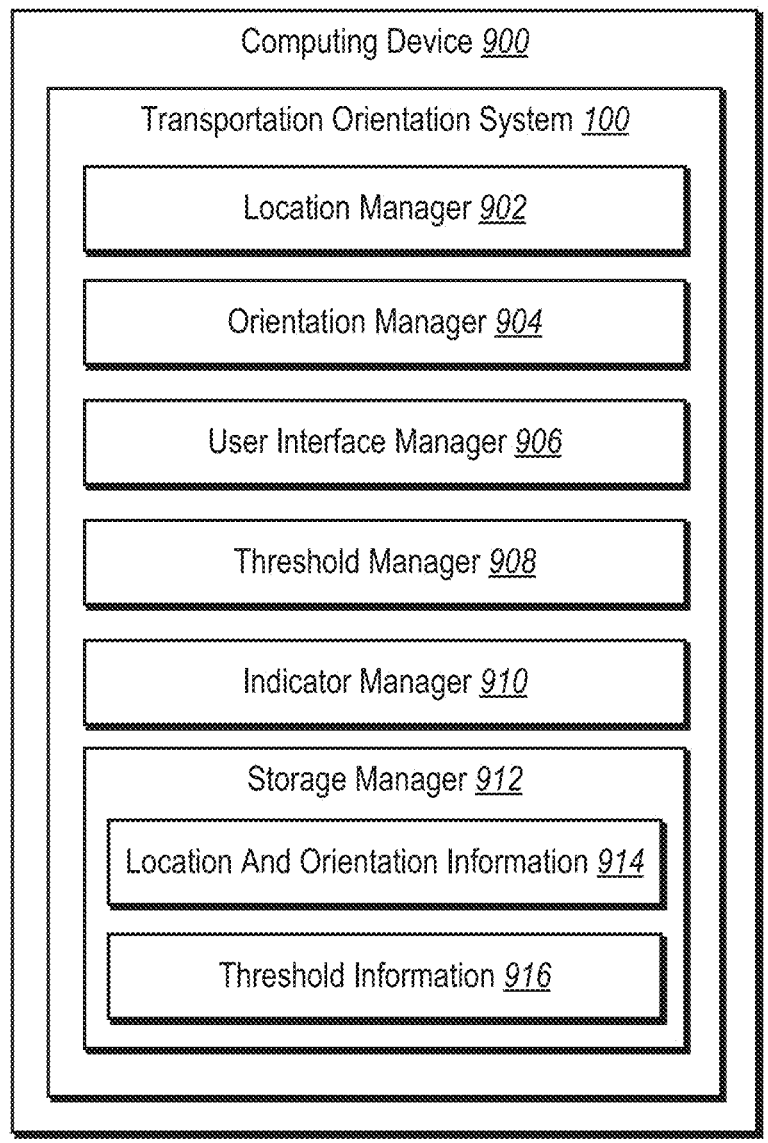
FIG. 9 illustrates an example schematic diagram of a transportation orientation system in accordance with one or more embodiments.

Turning now to FIG. 9, additional detail will be provided regarding components and capabilities of the transportation orientation system 100. Specifically, FIG. 9 illustrates an example schematic diagram of the transportation orientation system 100 on an exemplary computing device 900 (e.g., the requester client device 114, the provider client device 108, and/or the server(s) 112). As shown in FIG. 9, the transportation orientation system 100 may include a location manager 902, an orientation manager 904, a user interface manager 906, a threshold manager 908, an indicator manager 910, and a storage manager 912. While FIG. 9 depicts a particular number of components, in some embodiments, the transportation orientation system 100 may include more or fewer components. In addition, the components may perform additional or alternative tasks than those described hereafter.

As illustrated in FIG. 9, the transportation orientation system 100 includes a location manager 902. For example, the location manager 902 identifies, evaluates, discerns, extrapolates, calculates, and/or otherwise determines one or more locations. For example, the location manager 902 can determine a location of the requester client device 114 as well as the transportation vehicle 104 (e.g., the location of the provider client device 108). Additionally, the location manager 902 communicates with the indicator manager 910 and the user interface manager 906 to provide an indicator that indicates the location of the requester client device 114 and/or the transportation vehicle 104, as described above.

In addition, as illustrated in FIG. 9, the transportation orientation system 100 may include an orientation manager 904. For instance, the orientation manager 904 identifies, measures, evaluates, discerns, extrapolates, calculates, and/or otherwise determines an orientation of the requester client device 114 and/or the transportation vehicle 104, as described above. To illustrate, as described above, the orientation manager 904 can utilize a magnetometer to determine an orientation of one or more devices. Furthermore, the orientation manager 904 may communicate with the indicator manager 910 and the user interface manager 906 to provide an indicator that indicates the orientation of the requester client device 114 and/or the transportation vehicle 104.

Moreover, as shown in FIG. 9, the transportation orientation system 100 may include a user interface manager 906. The user interface manager 906 may display, by way of a requester client device 114 and/or a provider client device 108, a user interface that includes a navigation pane and/or an information pane, as described above. For instance, the user interface manager 906 may provide, for display, a digital compass to indicate the direction from the requester client device 114 to the transportation vehicle 104. The user interface manager 906 may also communicate with the threshold manager 908 to provide indicators relating to a threshold angle and/or a threshold distance, as described above.

Furthermore, as shown in FIG. 9, the transportation orientation system 100 also includes the threshold manager. The threshold manager 908 may determine, select, set, or apply a threshold angle. For instance, the threshold manager 908 may communicate with the user interface manager 906 to receive user input (e.g., from the requester 118 or provider 106) to set a threshold angle. Alternatively, the threshold manager 908 may communicate with various sensors such a light sensor to determine threshold angle as an angle that approximates the average field of view of a person in the particular environment (e.g., lighting conditions, etc.). In any case, the threshold manager 908 calculates, receives, sets, identifies, creates, generates, or otherwise determines a threshold angle.

The threshold manager 908 may also set a distance threshold. For instance, the threshold manager 908 may receive, set, identify, create, generate, or otherwise determine a threshold distance based on user input, lighting conditions, predefined parameters (e.g., hardcoded parameters), or other factors described herein.

As illustrated in FIG. 9, the transportation orientation system 100 may further include an indicator manager 910. The indicator manager 910 may communicate with other components of the transportation orientation system 100 to receive information relating to the direction from the requester client device 114 to the transportation vehicle 104. The indicator manager 910 can also create or generate a digital compass that points in the determined direction. Furthermore, the indicator manager 910 may communicate with components to provide an indicator in response to determining that the orientation of the requester client device 114 is within a threshold angle and/or in response to determining that the requester client device 114 is within a threshold distance of the transportation vehicle 104, as described above.

To create, generate, or otherwise provide a digital compass and/or other indicator(s), the indicator manager 910 performs the angle and distance calculations described above with reference to FIG. 5. For example, the indicator manager 910 determines an angle between a vector pointing from the location of the requester client device 114 or the provider client device 108 to magnetic north and a vector pointing between the requester client device 114 and the provider client device 108 and or transportation vehicle 104. The indicator manager 910 also calculates an angle between the vector pointing magnetic north and a vector pointing in the orientation of the requester client device 114 or the provider client device 108/transportation vehicle 104. The indicator manager 910 also determines an angle between the vector pointing in the orientation of the requester client device 114 or the provider client device 108/transportation vehicle 104 and the vector pointing between the requester client device 114 and the provider client device 108/transportation vehicle 104. Based on these angles, the indicator manager 910 may calculate the offset angle to provide indicator(s) by way of the requester client device 114 and/or the provider client device 108, as described above.

Furthermore, the transportation orientation system 100 may include a storage manager 912, as illustrated in FIG. 9. The storage manager 912 may include location and orientation information 914, and may further include threshold information 916. For instance, the storage manager 912 may communicate with the location manager 902, the orientation manager 904, and the threshold manager 908 to store location information and orientation information. Thus, the indicator manager 910, the threshold manager 908, and/or the user interface manager 906 may access the information within the storage manager 912 to provide the indicators and user interface elements described above.

Figure 10:
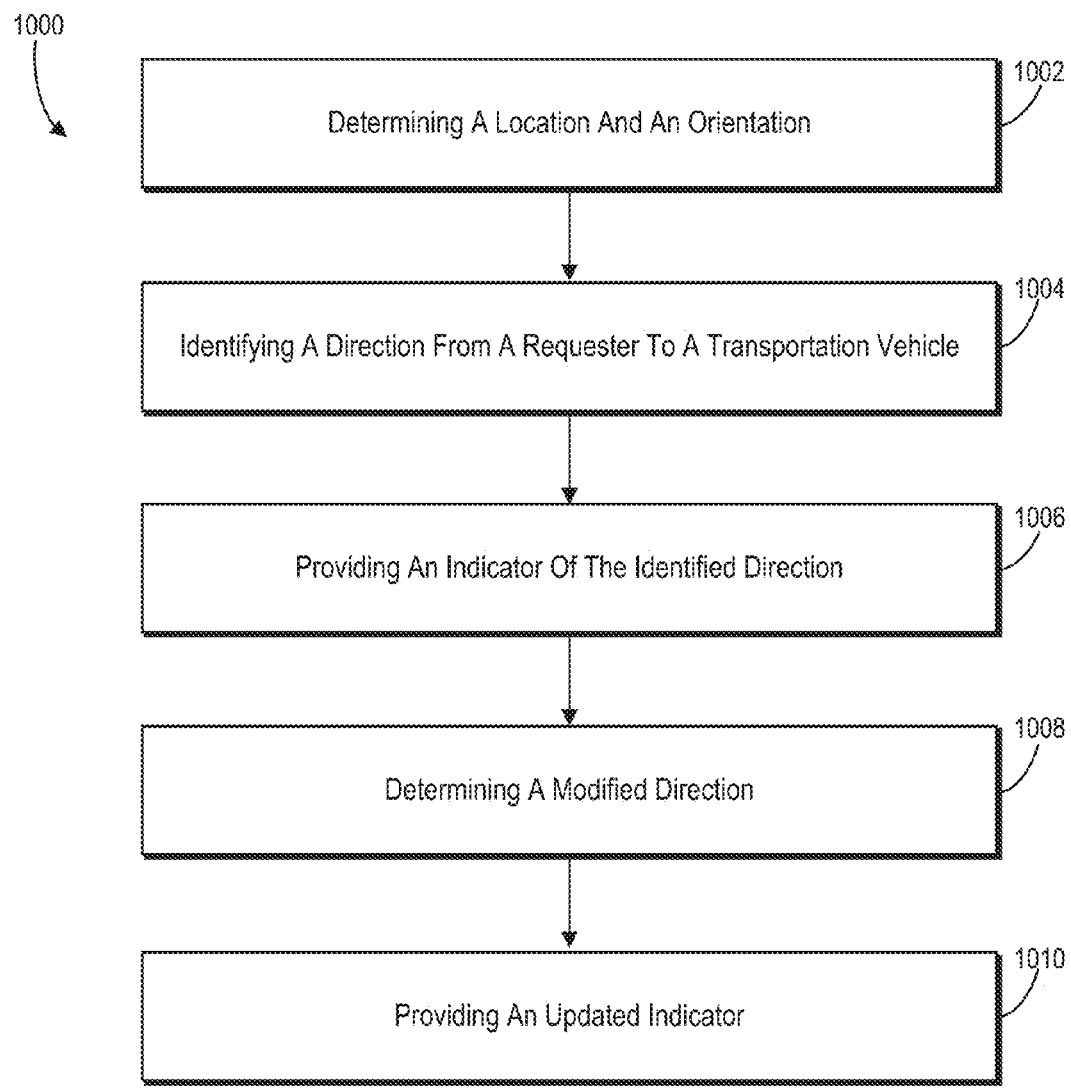
FIG. 10 illustrates a flowchart of a series of acts in a method of providing an indicator of the direction from a requester client device to a transportation vehicle in accordance with one or more embodiments.
Figure 11:
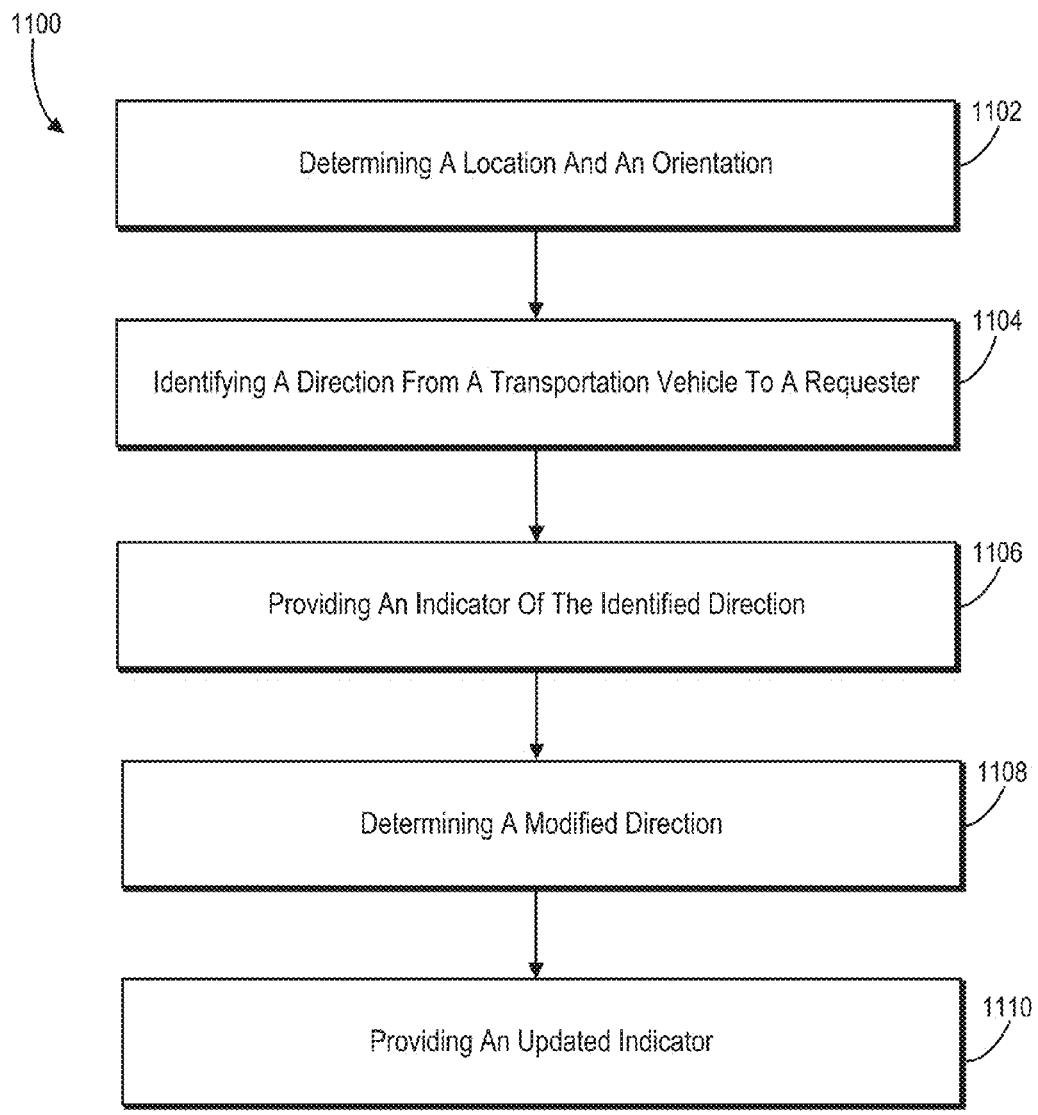
FIG. 11 illustrates a flowchart of a series of acts in a method of providing an indicator of the direction from a transportation vehicle to a requester client device in accordance with one or more embodiments.

FIGS. 1-8, the corresponding text, and the examples provide a number of different systems and methods for generating and providing an indicator corresponding to a direction between a requester and a transportation vehicle. In addition to the foregoing, embodiments can also be described in terms of flowcharts comprising acts and/or steps in a method for accomplishing a particular result. For example, FIGS. 10-11 illustrate flowcharts of exemplary methods in accordance with one or more embodiments. The methods described in relation to FIGS. 10-11 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 10 illustrates a flowchart of a series of acts in a method 1000 of providing an indicator of a direction between a requester and a transportation vehicle. The method 1000 may include an act 1002 of determining a location and an orientation. For instance, the act 1002 may involve determining a location of a requester client device, a location of a transportation vehicle, and an orientation of the requester client device. The act 1002 may further involve presenting, via a display of the requester client device, a digital compass that points in the direction from the requester client device to the transportation vehicle. In some embodiments, the transportation vehicle may be an autonomous vehicle. Accordingly, the act 1002 may involve receiving an indication of the location of the transportation vehicle from a locator device associated with the autonomous transportation vehicle. Determining the location of the transportation vehicle may involve receiving an indication of the location of the transportation vehicle from a provider client device associated with a provider of the transportation vehicle.

The method 1000 may further include an act 1004 of identifying a direction from a requester to a transportation vehicle. For instance, the act 1004 may involve identifying, based on the determined location of the requester client device, the determined location of the transportation vehicle, and the determined orientation of the requester client device, a direction from the requester client device to the transportation vehicle. The act 1004 may further involve determining an angle between a vector originating at the location of the requester client device and pointing in the orientation of the requester client device and a vector originating at the location of the requester client device and pointing toward the location of the transportation vehicle. To elaborate, the act 1004 may involve determine a difference between: 1) an angle between a vector originating at the location of the requester client device and pointing toward magnetic north and a vector originating at the location of the requester client device and pointing toward the location of the transportation vehicle, and 2) an angle between the vector originating at the location of the requester client device and pointing toward magnetic north and the vector originating at the location of the requester client device and pointing in the orientation of the requester client device.

In addition, the method 1000 may include an act 1006 of providing an indicator of the identified direction. For instance, the act 1006 may involve providing, via the requester client device, an indicator corresponding to the identified direction from the requester client device to the transportation vehicle.

The method 1000 may further include an act 1008 of determining a modified direction. For instance, the act 1008 may involve detecting a change in at least one of the location of the requester client device, the location of the transportation vehicle, or the orientation of the requester client device. Detecting the change may involve detecting a change in the location of the transportation vehicle and/or detecting a change in the location of the requester client device. Additionally, the act 1008 may involve, upon detecting a change in at least one of the location of the requester client device, the location of the transportation vehicle, or the orientation of the requester client device, determining a modified direction from the requester client device to the transportation vehicle.

Furthermore, the method 1000 may include an act of providing an updated indicator. For instance, the act 1010 may involve providing, via the requester client device, an updated indicator associated with the modified direction from the requester client device to the transportation vehicle. The act 1010 may further involve, in response to detecting the change in the location of the transportation vehicle, providing an indication to the requester by way of the requester client device that the transportation vehicle is moving. In addition, the act 1010 may involve, in response to detecting the change in the location of the requester client device, providing an indication to the requester by way of the requester client device that the requester client device is moving.

Though not illustrated in FIG. 10, the method 1000 may further include an act of determining that the orientation of the requester client device is within a threshold angle of the direction from the requester client device to the transportation vehicle. For instance, providing the indicator associated with the identified direction from the requester client device to the transportation vehicle may involve providing, by way of the requester client device and in response to determining that the orientation of the requester client device is within the threshold angle of the direction from the requester client device to the transportation vehicle, at least one of an auditory alert, a visual alert, or a haptic alert. In addition, the method 1000 may include an act of, in response to detecting that the orientation of the requester client device is within the threshold angle of the direction from the requester client device to the transportation vehicle, providing at least one of an auditory alert or a visual alert via the transportation vehicle. For example, providing the at least one of the auditory alert or the visual alert via the transportation vehicle may involve providing, to the autonomous transportation vehicle, an indication to honk a horn of the autonomous transportation vehicle or an indication to flash headlights of the autonomous transportation vehicle, respectively.

The method 1000 may further include an act of determining a distance between the requester client device and the transportation vehicle, and, upon detecting that the distance between the requester client device and the transportation vehicle is within a threshold distance, providing an indication to the requester by way of the requester client device that the distance between the requester client device and the transportation vehicle is within the threshold distance.

FIG. 11 illustrates a flowchart of a series of acts in a method 1100 of providing an indicator of a direction from a transportation vehicle to a requester. The method 1100 may include and act 1102 of determining a location and an orientation. For instance, the act 1102 may involve determining a location of a requester client device, a location of a transportation vehicle, and an orientation of the transportation vehicle.

The method 1100 may further include an act 1104 of identifying a direction from a transportation vehicle to a requester. For instance, the act 1104 may involve identifying, based on the determined location of the requester client device, the determined location of the transportation vehicle, and the determined orientation of the transportation vehicle, a direction from the transportation vehicle to the requester client device. The act 1104 may further involve determining an angle between a vector originating at the location of the transportation vehicle and pointing in the orientation of the transportation vehicle and a vector originating at the location of the transportation vehicle and pointing toward the location of the requester client device. In addition, the act 1104 may involve determining a difference between: 1) an angle between a vector originating at the location of the transportation vehicle and pointing toward magnetic north and a vector originating at the location of the transportation vehicle and pointing toward the location of the requester client device, and 2) an angle between the vector originating at the location of the transportation vehicle and pointing toward magnetic north and the vector originating at the location of the transportation vehicle and pointing in the orientation of the transportation vehicle.

In addition, the method 1100 may include an act 1106 of providing an indicator of the identified direction. For instance, the act 1106 may involve providing, via the transportation vehicle, an indicator associated with the identified direction from the transportation vehicle to the requester client device. The act 1106 may further involve presenting, via a display of a provider client device, a digital compass that points in the direction from the transportation vehicle to the requester client device.

Furthermore, the method 1100 may include an act 1106 of determining a modified direction. For instance, the act 1106 may involve, upon detecting a change in at least one of the location of the requester client device, the location of the transportation vehicle, or the orientation of the transportation vehicle, determining a modified direction from the transportation vehicle to the requester client device.

The method 1100 may still further include an act 1110 of providing an updated indicator. For instance, the act 1110 may involve providing, via the transportation vehicle, an updated indicator associated with the modified direction from the transportation vehicle to the requester client device.

Though not illustrated in FIG. 11, the method 1100 may include an act of determining that the orientation of the transportation vehicle is within a threshold angle of the direction from the transportation vehicle to the requester client device. Accordingly, providing the indicator associated with the identified direction from the transportation vehicle to the requester client device may involve providing, by way of the transportation vehicle and in response to detecting that the orientation of the transportation vehicle is within the threshold angle of the direction from the transportation vehicle to the requester client device, at least one of an auditory alert or a visual alert.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
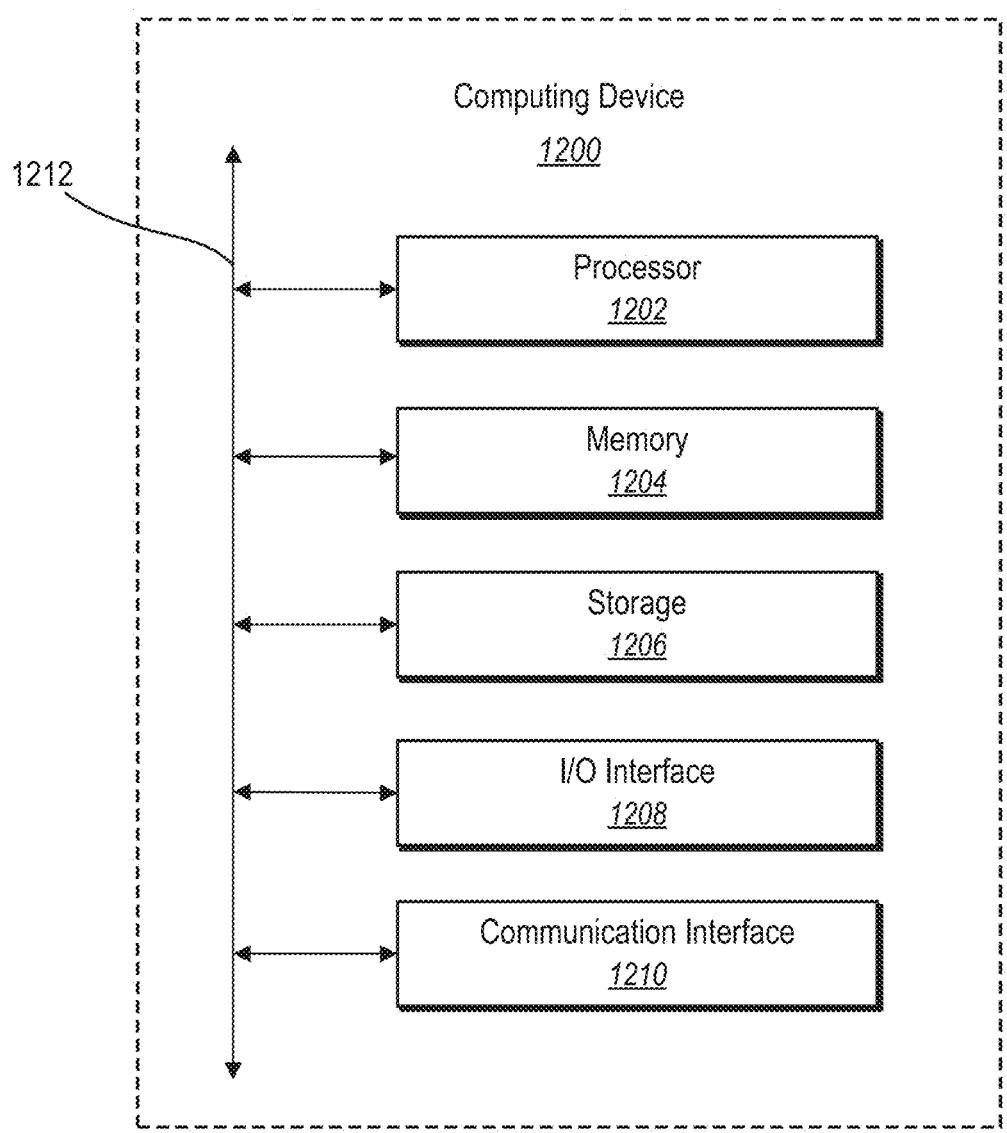
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the transportation orientation system 100 can comprise implementations of the computing device 1200. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 11 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user (e.g., requester or provider) to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output providers (e.g., display providers), one or more audio speakers, and one or more audio providers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

Figure 13:
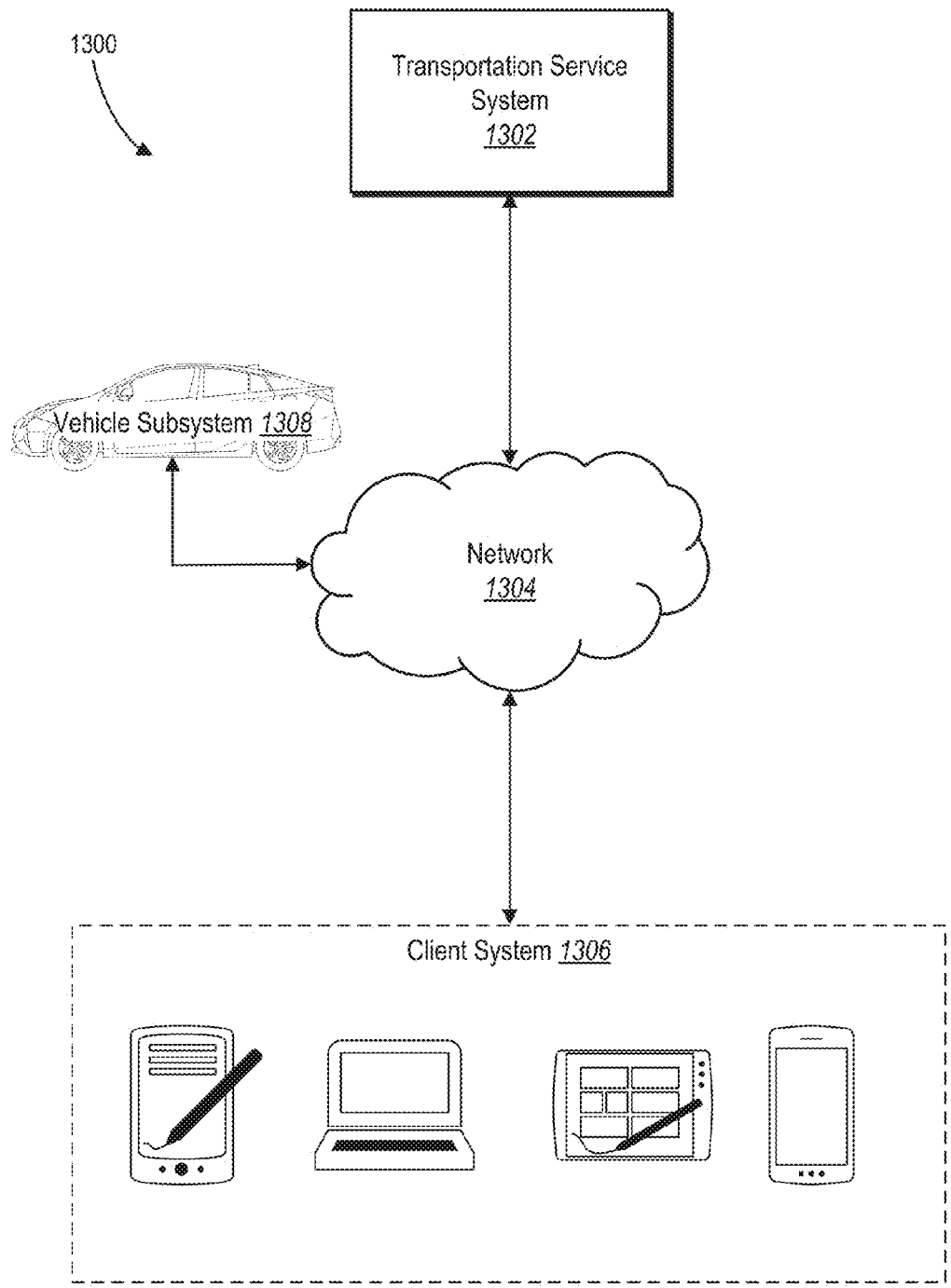
FIG. 13 illustrates an example environment for a transportation service system in accordance with one or more embodiments.

FIG. 13 illustrates an example network environment 1300 of a transportation service system. The network environment 1300 includes a client system 1306, a transportation service system 1302, and a vehicle subsystem 1308 connected to each other by a network 1304. Although FIG. 13 illustrates a particular arrangement of the client system 1306, transportation service system 1302, vehicle subsystem 1308, and network 1304, this disclosure contemplates any suitable arrangement of client system 1306, transportation service system 1302, vehicle subsystem 1308, and network 1304. As an example, and not by way of limitation, two or more of client system 1306, transportation service system 1302, and vehicle sub system 1308 communicate directly, bypassing network 1304. As another example, two or more of client system 1306, transportation service system 1302, and vehicle subsystem 1308 may be physically or logically co-located with each other in whole or in part. Moreover, although FIG. 13 illustrates a particular number of client systems 1306, transportation service systems 1302, vehicle subsystems 1308, and networks 1304, this disclosure contemplates any suitable number of client systems 1306, transportation service systems 1302, vehicle subsystems 1308, and networks 1304. As an example, and not by way of limitation, network environment 1300 may include multiple client system 1306, transportation service systems 1302, vehicle subsystems 1308, and networks 1304.

This disclosure contemplates any suitable network 1304. As an example, and not by way of limitation, one or more portions of network 1304 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1304 may include one or more networks 1304.

Links may connect client system 1306, transportation service system 1302, and vehicle subsystem 1308 to communication network 1304 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client system 1306 may be an electronic device including hardware, software, or embedded logic components or a combination of two or more such components and capable of carrying out the appropriate functionalities implemented or supported by client system 1306. As an example, and not by way of limitation, a client system 1306 may include any of the computing devices discussed above in relation to FIG. 12. A client system 1306 may enable a network user at client system 1306 to access network 1204. A client system 1306 may enable its user to communicate with other users at other client systems 1306.

In particular embodiments, client system 1306 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1306 may enter a Uniform Resource Locator (URL)

or other address directing the web browser to a particular server (such as server), and the web browser may generate a Hyper Text Transfer Protocol (HTTP) request and communicate the HTTP request to server. The server may accept the HTTP request and communicate to client system 1306 one or more Hyper Text Markup Language (HTML) files responsive to the HTTP request. Client system 1306 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation service system 1302 may be a network-addressable computing system that can host a ride share transportation network. Transportation service system 1302 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation service system 1302. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation service system 1302 may manage ride matching services to connect a user/requester with a vehicle and/or provider. By managing the ride matching services, the transportation service system 1302 can manage the distribution and allocation of vehicle subsystem 102 resources and user resources such as GPS location and availability indicators, as described herein.

Transportation service system 1302 may be accessed by the other components of network environment 1300 either directly or via network 1304. In particular embodiments, transportation service system 1302 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation service system 1302 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1306, or a transportation service system 1302 to manage, retrieve, modify, add, or delete, the information stored in data store.

In particular embodiments, transportation service system 1302 may provide users with the ability to take actions on various types of items or objects, supported by transportation service system 1302. As an example, and not by way of limitation, the items and objects may include ride share networks to which users of transportation service system 1302 may belong, vehicles why users may request, location designators, computer-based applications that a user may use, transactions that allow users to buy or sell items via the service, interactions with advertisements that a user may perform, or other suitable items or objects. A user may interact with anything that is capable of being represented in transportation service system 1302 or by an external system of a third-party system, which is separate from transportation service system 1302 and coupled to transportation service system 1302 via a network 1304.

In particular embodiments, transportation service system 1302 may be capable of linking a variety of entities. As an example, and not by way of limitation, transportation service system 1302 may enable users to interact with each other or other entities, or to allow users to interact with these entities through an application programming interfaces (API) or other communication channels.

In particular embodiments, transportation service system 1302 may include a variety of servers, sub-systems, programs, modules, logs, and data stores. In particular embodiments, transportation service system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation service system 1302 may also include suitable components such as network interfaces, security mechanisms, load balancers, failover servers, management-and-network-operations consoles, other suitable components, or any suitable combination thereof. In particular embodiments, transportation service system 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation service system 1302 and one or more client systems 1306. An action logger may be used to receive communications from a web server about a user's actions on or off transportation service system 1302. In conjunction with the action log, a third-party-content-object log may be maintained of user exposures to third-party-content objects. A notification controller may provide information regarding content objects to a client system 1306. Information may be pushed to a client system 1306 as notifications, or information may be pulled from client system 1306 responsive to a request received from client system 1306. Authorization servers may be used to enforce one or more privacy settings of the users of transportation service system 1302. A privacy setting of a user determines how particular information associated with a user can be shared. The authorization server may allow users to opt in to or opt out of having their actions logged by transportation service system 1302 or shared with other systems, such as, for example, by setting appropriate privacy settings. Third-party-content-object stores may be used to store content objects received from third parties. Location stores may be used for storing location information received from client systems 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—i.e., split up throughout the vehicle subsystem 1308 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client system 1306 and/or the transportation service system 1302. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   determining a location of a requester client device, a location of a transportation vehicle, and an orientation of the requester client device;
   identifying, based on the determined location of the requester client device, the determined location of the transportation vehicle, and the determined orientation of the requester client device, a direction from the requester client device to the transportation vehicle;
   determining that the orientation of the requester client device is within a threshold angle of the direction from the requester client device to the transportation vehicle;
   providing, via the requester client device, an indicator corresponding to the identified direction from the requester client device to the transportation vehicle;
   upon detecting a change in at least one of the location of the requester client device, the location of the transportation vehicle, or the orientation of the requester client device, determining a modified direction from the requester client device to the transportation vehicle; and
   providing, via the requester client device, an updated indicator associated with the modified direction from the requester client device to the transportation vehicle.

2. The method of claim 1, wherein identifying the direction from the requester client device to the transportation vehicle comprises determining an angle between a vector originating at the location of the requester client device and pointing in the orientation of the requester client device and a vector originating at the location of the requester client device and pointing toward the location of the transportation vehicle.

3. The method of claim 2, wherein determining the angle between the vector originating at the location of the requester client device and pointing in the orientation of the requester client device and the vector originating at the location of the requester client device and pointing toward the location of the transportation vehicle comprises determining a difference between:
   an angle between a vector originating at the location of the requester client device and pointing toward magnetic north and the vector originating at the location of the requester client device and pointing toward the location of the transportation vehicle; and
   an angle between the vector originating at the location of the requester client device and pointing toward magnetic north and the vector originating at the location of the requester client device and pointing in the orientation of the requester client device.

4. The method of claim 1, wherein providing the indicator associated with the identified direction from the requester client device to the transportation vehicle comprises presenting, via a display of the requester client device, a digital compass that points in the direction from the requester client device to the transportation vehicle relative to the orientation of the requester client device.

5. The method of claim 1, wherein determining the location of the transportation vehicle comprises receiving location information from a remote server.

6. The method of claim 5, wherein providing the indicator associated with the identified direction from the requester client device to the transportation vehicle comprises providing, by way of the requester client device and in response to determining that the orientation of the requester client device is within the threshold angle of the direction from the requester client device to the transportation vehicle, at least one of an auditory alert, a visual alert, or a haptic alert.

7. The method of claim 6, further comprising:
determining a distance between the requester client device and the transportation vehicle; and
upon detecting that the distance between the requester client device and the transportation vehicle is within a threshold distance, providing an indication to the requester client device that the distance between the requester client device and the transportation vehicle is within the threshold distance.

8. The method of claim 5, further comprising, in response to detecting that the orientation of the requester client device is within the threshold angle of the direction from the requester client device to the transportation vehicle, providing at least one of an auditory alert or a visual alert via the transportation vehicle.

9. The method of claim 8, wherein:
the transportation vehicle is an autonomous transportation vehicle;
determining the location of the transportation vehicle comprises receiving, by way of a remote server, an indication of the location of the transportation vehicle from a locator device associated with the autonomous transportation vehicle; and
providing the at least one of the auditory alert or the visual alert via the transportation vehicle comprises providing, to the autonomous transportation vehicle, at least one of: an indication to honk a horn of the autonomous transportation vehicle or an indication to flash headlights of the autonomous transportation vehicle.

10. A non-transitory computer readable storage medium comprising instructions that, when executed by at least one processor, cause a computer system to:
determine a location of a requester client device, a location of a transportation vehicle, and an orientation of the requester client device;
identify, based on the determined location of the requester client device, the determined location of the transportation vehicle, and the determined orientation of the requester client device, a direction from the requester client device to the transportation vehicle;
determine that the orientation of the requester client device is within a threshold angle of the direction from the requester client device to the transportation vehicle;
provide, via the requester client device, an indicator associated with the identified direction from the requester client device to the transportation vehicle;
upon detecting a change in at least one of the location of the requester client device, the location of the transportation vehicle, or the orientation of the requester client device, determine a modified direction from the requester client device to the transportation vehicle; and
provide, via the requester client device, an updated indicator associated with the modified direction from the requester client device to the transportation vehicle.

11. The non-transitory computer-readable storage medium of claim 10, wherein determining the location of the transportation vehicle comprises one or more of:
receiving location information from a remote server; or
determining the location of the transportation vehicle comprises receiving an indication of the location of the transportation vehicle from a provider client device associated with a provider of the transportation vehicle.

12. The non-transitory computer-readable storage medium of claim 10, wherein:
detecting the change comprises detecting a change in the location of the transportation vehicle; and
providing the updated indicator associated with the modified direction from the requester client device to the transportation vehicle comprises, in response to detecting the change in the location of the transportation vehicle, providing an indication, to the requester by way of the requester client device, that the transportation vehicle is moving.

13. The non-transitory computer-readable storage medium of claim 10, wherein:
detecting the change comprises detecting a change in the orientation of the requester client device.

14. The non-transitory computer-readable storage medium of claim 10, further comprising instructions that, when executed by the at least one processor, cause the computer system to:
determine a distance between the requester client device and the transportation vehicle; and
upon detecting that the distance between the requester client device and the transportation vehicle is within a threshold distance, provide, to the requester by way of the transportation vehicle, at least one of an auditory alert or a visual alert that the distance between the requester client device and the transportation vehicle is within the threshold distance.

15. A non-transitory computer readable storage medium comprising instructions thereon that, when executed by at least one processor, cause a computer system to:
determine a location of a requester client device, a location of a transportation vehicle, and an orientation of the transportation vehicle;
identify, based on the determined location of the requester client device, the determined location of the transportation vehicle, and the determined orientation of the transportation vehicle, a direction from the transportation vehicle to the requester client device;
provide, via the transportation vehicle, an indicator associated with the identified direction from the transportation vehicle to the requester client device;
upon detecting a change in at least one of the location of the requester client device, the location of the transportation vehicle, or the orientation of the transportation vehicle, determine a modified direction from the transportation vehicle to the requester client device; and
provide, via the transportation vehicle, an updated indicator associated with the modified direction from the transportation vehicle to the requester client device.

16. The non-transitory computer readable storage medium of claim 15, further comprising instructions that, when executed by the at least one processor, cause the computer system to determine that the orientation of the transportation vehicle is within a threshold angle of the direction from the transportation vehicle to the requester client device.

17. The non-transitory computer readable storage medium of claim 16, wherein providing the indicator associated with the identified direction from the transportation vehicle to the requester client device comprises providing, by way of the transportation vehicle and in response to detecting that the orientation of the transportation vehicle is within the threshold angle of the direction from the transportation vehicle to the requester client device, at least one of an auditory alert or a visual alert.

18. The non-transitory computer readable storage medium of claim 15, wherein identifying the direction from the transportation vehicle to the requester client device comprises determining an angle between a vector originating at the location of the transportation vehicle and pointing in the orientation of the transportation vehicle and a vector originating at the location of the transportation vehicle and pointing toward the location of the requester client device.

19. The non-transitory computer readable storage medium of claim 18, wherein determining the angle between the vector originating at the location of the transportation vehicle and pointing in the orientation of the transportation vehicle and the vector originating at the location of the transportation vehicle and pointing toward the location of the requester client device comprises determining a difference between:
- an angle between a vector originating at the location of the transportation vehicle and pointing toward magnetic north and the vector originating at the location of the transportation vehicle and pointing toward the location of the requester client device; and
- an angle between the vector originating at the location of the transportation vehicle and pointing toward magnetic north and the vector originating at the location of the transportation vehicle and pointing in the orientation of the transportation vehicle.

20. The non-transitory computer readable storage medium of claim 15, wherein determining the location of the requester client device comprises receiving location information from a remote server.

* * * * *